United States Patent
Mueck et al.

(10) Patent No.: US 10,681,558 B2
(45) Date of Patent: Jun. 9, 2020

(54) METHODS AND DEVICES FOR USER DETECTION IN SPECTRUM SHARING

(71) Applicant: Intel Corporation, Santa Clara, CA (US)

(72) Inventors: Markus Dominik Mueck, Unterhaching (DE); Ying He, Sydney (AU); Beeshanga Jayawickrama, Sydney (AU); Eryk Dutkiewicz, Wollongong (AU)

(73) Assignee: Apple Inc., Cupertino, CA (US)

( * ) Notice: Subject to any disclaimer, the term of this patent is extended or adjusted under 35 U.S.C. 154(b) by 840 days.

(21) Appl. No.: 15/190,221

(22) Filed: Jun. 23, 2016

(65) Prior Publication Data

US 2017/0374557 A1 Dec. 28, 2017

(51) Int. Cl.
| | |
|---|---|
| *H04W 16/14* | (2009.01) |
| *H04L 27/26* | (2006.01) |
| *H04L 27/00* | (2006.01) |
| *H04W 72/04* | (2009.01) |

(52) U.S. Cl.
CPC ......... *H04W 16/14* (2013.01); *H04L 27/0006* (2013.01); *H04L 27/2655* (2013.01); *H04L 27/2692* (2013.01); *H04W 72/0453* (2013.01)

(58) Field of Classification Search
CPC .................. H04W 16/14; H04W 72/0453
USPC ........................................... 375/260
See application file for complete search history.

(56) References Cited

U.S. PATENT DOCUMENTS

| | | | |
|---|---|---|---|
| 2013/0273912 A1 | 10/2013 | Xu et al. | |
| 2014/0213206 A1* | 7/2014 | Morris | H03F 3/24 455/226.1 |

FOREIGN PATENT DOCUMENTS

EP        2763368 A2     8/2014

OTHER PUBLICATIONS

FCC 15-47, Federal Communications Commission, "Report and Order and Second Further Notice of Proposed Rulemaking", Amendment of the Commission's Rules with Regard to Commercial Operations in the 3550-3650 MHz Band, Apr. 21, 2015, 187 pages, Washington, D.C., USA.

(Continued)

*Primary Examiner* — Michael R Neff
(74) *Attorney, Agent, or Firm* — Kowert, Hood, Munyon, Rankin & Goetzel, P.C.

(57) ABSTRACT

A communication circuit arrangement includes a sub sampling circuit configured to obtain wideband signal data including candidate reference sequences from a plurality of carrier channels and to downsample the wideband signal data to shift the candidate reference sequences closer to each other in frequency, a comparison circuit configured to compare the downsampled signal data to a composite detection sequence to detect whether any of the candidate reference sequences match any of a plurality of predefined reference sequences in the composite detection sequence, and a decision circuit configured to determine whether any of the plurality of carrier channels contain an active network based on the detection results.

25 Claims, 11 Drawing Sheets

(56) References Cited

OTHER PUBLICATIONS

3GPP TS 36.211 V13.1.0, 3rd Generation Partnership Project; Technical Specification Group Radio Access Network; Evolved Universal Terrestrial Radio Access (E-UTRA); Physical channels and modulation, Mar. 2016, pp. 129-132, Release 13, 3GPP, Valbonne, France.

The Extended European Search Report received for the corresponding patent application No. 17172304.2 (8 Pages) dated Oct. 30, 2017.

\* cited by examiner

METHODS AND DEVICES FOR USER DETECTION IN SPECTRUM SHARING

TECHNICAL FIELD

Various embodiments relate generally to methods and devices for user detection in spectrum sharing.

BACKGROUND

Recent developments in radio frequency licensing such as spectrum sharing have introduced new possibilities for Mobile Network Operators (MNOs). In particular, proposed spectrum sharing schemes such as Licensed Spectrum Access (LSA, proposed mainly for Europe in the 2.3-2.4 GHz bands) and Spectrum Access System (SAS, proposed mainly in the U.S. for the 3.55-3.7 bands) may open up access to previously restricted wireless frequency bands for mobile communications by allowing MNOs to share certain spectrum bands with "incumbent" users.

Both LSA and SAS propose to use a 'tiered' approach to manage spectrum access where the incumbents occupy the highest 'tier' and thus have the highest priority to utilize the shared spectrum. Accordingly, licensed users may need to ensure that a given shared band is not being utilized by an incumbent before accessing the band. While LSA as currently proposed only specifies a two-tiered system of incumbents of licensees, the SAS framework additionally proposes another tier of 'priority' users which may enjoy access priority over lower priority or 'general' users while still yielding access to incumbents. Accordingly, the general users (referred to as General Authorized Access (GAA) users) may only be permitted to access shared spectrum when neither incumbents nor priority users (referred to as Priority Access License (PAL) users) are actively using the shared spectrum. General users may therefore need to perform sensing operations in order to determine when use of shared SAS spectrum is permitted, i.e. when no incumbents or priority users are active on the shared spectrum.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
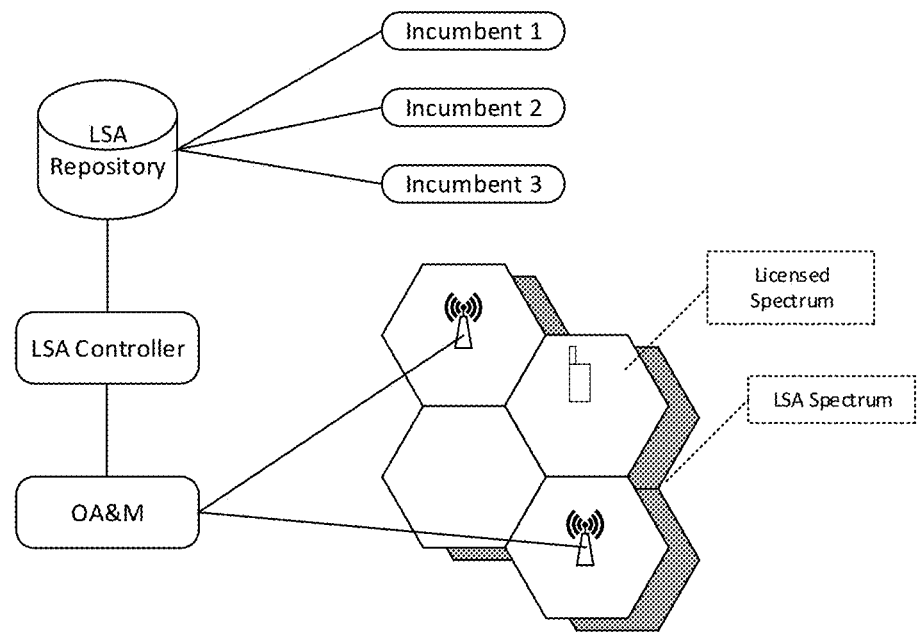
FIG. 1 shows an LSA spectrum sharing network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

The following description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), etc. The examples provided herein are thus understood as being applicable to various other mobile communication technologies, both existing and not yet formulated, particularly in cases where such mobile communication.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

In spectrum sharing schemes such as Licensed Spectrum Access (LSA, proposed mainly for Europe in the 2.3-2.4

GHz bands) and Spectrum Access System (SAS, proposed mainly in the U.S. for the 3.55-3.7 bands), Mobile Network Operators (MNOs) may be granted access to previously restricted radio frequency bands. Accordingly, an SAS or LSA "licensee" may license certain targeted frequency bands from "incumbents", and thus may be able to utilize the shared frequency bands.

While the targeted frequency bands for LSA and SAS may already be officially licensed and/or owned by the incumbents (mainly related to government use), the targeted frequency bands may be under-utilized over time and/or space. For example, the incumbents may utilize the targeted frequency bands relatively rarely, and/or may employ the targeted frequency bands only in certain areas. Accordingly, LSA and SAS propose a system in which the targeted frequency bands may be made available to cellular MNOs in scenarios (both geographically and temporally dependent) where the incumbent is not occupying the band. For example, one or more licensed MNOs may be granted access to the targeted frequency bands in scenarios where the incumbent is not actively occupying the targeted frequency bands, and accordingly may utilize the newly available bandwidth for mobile communications.

As indicated above, LSA has identified the 2.3-2.4 GHz frequency band (corresponding to 3GPP LTE Band 40) as a suitable candidate for spectrum sharing, and has additionally been the focus of proposals to also incorporate the 700 MHz and/or 3.6-3.8 GHz bands. Under the proposed LSA framework, a licensee (e.g. an MNO or any other entity that operates a wireless network) may operate a 3GPP LTE network on licensed shared basis, where a licensee may engage in a multi-year sharing contract with an incumbent (such as e.g. 10 years or more). As incumbents maintain prioritized access of the targeted LSA band over all licensees, any licensee may be required to vacate the targeted LSA band for a given geographic area, given frequency range, and given period of time during which an incumbent is accessing the targeted LSA band.

FIG. 1 shows block diagram 100 illustrating an LSA network architecture. As shown in FIG. 1, LSA spectrum management may rely on a centralized LSA Repository. Incumbents may be required to provide a-priori usage information to the database on the availability of LSA spectrum on a time- and geographic-basis. Depending on the indicated usage information, an LSA controller may employ control mechanisms to grant/deny spectrum access to various licensed incumbents and issue commands to vacate concerned bands. In the current proposed operational approach for LSA, sensing mechanisms may not be required to support the system for identification of incumbent operation. Accordingly, in many cases users may not need to perform sensing to detect incumbent usage; however, this may feasibly be adapted in future proposals.

The LSA repository may be a centralized entity that falls outside of the domain of the MNOs and may interface with the various incumbent users. In the context of LSA, such incumbent users may include wireless cameras (which are allocated spectrum in the targeted LSA band in Europe). Each LSA controller (where each MNO network may include one or more LSA controllers) may thus interface with the LSA repository in order to access the a-priori information provided by the various incumbent users. As shown in FIG. 1, an LSA controller may interface with the Operations, Administration, and Management (OA&M) framework of the MNO in order to provide information on the availability of the shared spectrum to the relevant MNO network components including base stations and end user terminals.

Similarly to LSA, proposed SAS arrangements may allow licensees to operate a 3GPP LTE network on the 3.55-3.7 GHz frequency band on a shared basis with an incumbent. However, as opposed to the two-tier system between incumbent and licensee (tier-2 and tier-2, respectively) in LSA, SAS additionally proposes a third tier (tier-3) composed of General Authorized Access (GAA) users. In this three-tier system, tier-2 users, or "Priority Access License" (PAL) users, may only be allocated a limited portion of the entire SAS band (e.g. the PAL spectrum with to 70 MHz bandwidth) in the absence of an incumbent. The remaining spectrum, in addition to any unused portions of the PAL spectrum, may be allotted to GAA users which may typically employ the available tier-3 spectrum for LTE Licensed Assisted Access (LSA) or WiFi-type systems.

Figure 2:
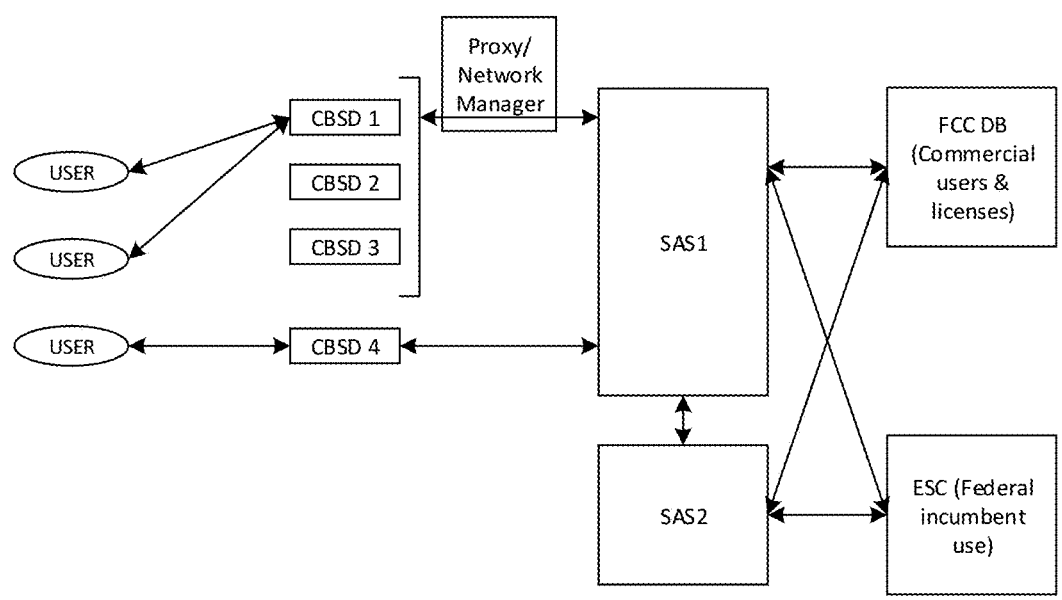
FIG. 2 shows an SAS spectrum sharing network.

FIG. 2 shows block diagram 200 illustrating an SAS network architecture. In contrast to LSA, SAS may be designed to ensure coexistence between incumbent users that are not able to provide any a-priori information to a centralized database. As indicated above, SAS may employ a three-tiered system composed of incumbents (tier-1), PAL users (tier-2), and GAA users (tier-3). SAS incumbent users may thus be the highest tier and may generally be protected from interference from the lower-tier PAL and GAA users. Such SAS incumbent users may conventionally be federal or military related, such as Department of Defense (DoD) radars, and may also include other wireless systems such as Fixed Satellite Service (FSS) stations and certain grandfathered terrestrial wireless systems. PAL users (which may include MNOs) may license 10 MHz bands in certain geographic areas (census tracts) and may receive interference protection from GAA users while accepting certain levels of interference from incumbent users. As incumbents are expected to be protected from interference from all lower-tier users, PAL users may be required to vacate the licensed band in certain scenarios where incumbent users wish to utilize the licensed band (where the specifics and frequency of such scenarios may depend on the particulars of each license). As the lowest-tier (tier-3), GAA users may not receive any interference protection (thus accepting interference from both PAL and incumbent users) and may similarly face vacation scenarios in order to protect incumbent users.

As shown in FIG. 2, SAS systems may additionally include an Environmental Sensing Capability (ESC) entity, which may be employed in order to protect incumbent users from interference from PAL and GAA users. Such ESC entities may be composed of a sensor network to detect radio activity by incumbent users, such as e.g. detecting radio activity by military radar, which may allow an SAS entity to instruct PAL and GAA users to cease transmissions on the shared spectrum and/or re-allocate transmission to a different portion of the shared spectrum in order to protect active incumbents.

Accordingly, SAS networks may include one or more SAS entities (e.g. SAS1 and SAS2 as shown in FIG. 2) which may interact with licensee users (GAA and PAL) in order to facilitate spectrum sharing while guaranteeing interference protection to higher-tiered users from lower-tiered users. Each SAS entity thus interact with the network architectures of the licensee users. As shown in FIG. 2, a SAS entity may interact with a single licensee transmitter (e.g. CBSD4) or with a network of licensee transmitters (e.g. CBSD1-CBSD3) via a proxy/network manager entity, which may act as an interface between a SAS entity and the various network components of a given MNO's network. Each network transmitter, e.g. a base station or small cell which are referred to as Citizens Broadband Radio Service Devices (CBSD) in the context of SAS, may thus be able to transmit wireless signals to end users (shown in FIG. 2) according to the shared spectrum access permitted by the corresponding SAS entity. SAS entities may aim to ensure that both the CBSDs (such as e.g. base stations and small cells) and end users (e.g. mobile terminals) do not cause excessive interference to incumbent users, which the SAS framework may enforce by specifying certain maximum permitted transmit power levels for CBSDs and end user terminals.

Both LSA and SAS may additionally provide Quality of Service (QOS) guarantees to licensees, where a licensee that is granted access to a particular frequency band may be guaranteed a certain QOS level. LSA and SAS also resolve congestion problems through central coordination, such as preventing over-utilization of the targeted frequency bands by incumbents and/or other MNOs at a given time at a central control entity. As previously detailed regarding FIGS. 1 and 2, LSA and SAS systems may employ an LSA controller and SAS entity, respectively, to coordinate access between incumbents and secondary users (e.g. registered licensees). Accordingly, these central control entities may grant secondary users access to LSA and SAS spectrum, which may be on an exclusive basis. Secondary users may therefore enjoy dedicated access to the additional spectrum available through LSA and SAS for a given period of time and in a given geographic area.

As access to LSA and SAS spectrum may be situation-dependent (i.e. time and geographic dependent), shared spectrum may be appropriate for use in a "supplemental" role. For example, given the variable availability of shared spectrum, it may be impractical (albeit possible) in many scenarios to realize a comprehensive wireless network entirely on shared spectrum. However, licensee MNOs may be able to utilize dedicated licensed spectrum (i.e. exclusively licensed by a licensee) in a primary role while allocating shared spectrum for supplemental uplink and/or downlink. Licensee MNOs may thus be able to rely on the constant availability of dedicated licensed spectrum while utilizing shared spectrum to increase bandwidth when the shared spectrum is available.

Accordingly, shared spectrum may be useful in carrier aggregation schemes, which may commonly have a "primary" carrier and one or more "secondary" carriers. Accordingly, licensees may use shared spectrum for secondary carriers to complement the primary carriers composed of dedicated licensed spectrum. Licensees may employ shared spectrum in this manner in either a supplemental downlink (SDL) or supplemental uplink (SUL) role, and may even be able to adjust the relative balance of shared spectrum for SDL and SUL, such as by allocating a greater number of either uplink frames or downlink frames in a Time Division Duplexing (TDD) system or by allocating more of the shared spectrum bandwidth to either uplink or downlink in a Frequency Division Duplexing (FDD) system.

Many of the bands identified by the proposed LSA and SAS systems for European and American systems are employed in other regions as TDD bands for Third Generation Partnership Project (3GPP) networks. Accordingly, many Original Equipment Manufacturers (OEM) may already manufacture handsets configured to utilize the LSA and SAS spectrum for 3GPP TDD networks. Accordingly, it may be relatively straightforward for OEMs to enable manufactured handsets to additionally use the LSA and SAS bands for 3GPP TDD in other regions where the LSA and SAS bands were previously unavailable due to wireless frequency licensing restrictions. Of particular interest may be FDD-TDD carrier aggregation in which a licensee may utilize dedicated licensed spectrum for the FDD carrier and shared licensed spectrum for the TDD carrier. The licensee may thus activate the shared licensed spectrum for the TDD carrier when the licensee is granted access to the shared licensed spectrum in the absence of the incumbent.

As noted above, both SAS and LSA may manage spectrum access according to a 'tiered' access system, where LSA provides for two-tier access system between incumbents and licensees and SAS provides for a three-tier access system between incumbents, PAL ('priority') users, and GAA ('general') users. While all licensed users (non-incumbents) may need to yield shared spectrum access rights to incumbents, general users in SAS networks may additionally need to be aware of priority user activity. Accordingly, general users may need to perform sensing on shared spectrum channels in order to ensure that the shared spectrum is free of both incumbents and priority users before accessing the shared spectrum. While the current LSA proposal does not include such scenarios due to the lack of an additional access tier, such may potentially be included in future proposals. Furthermore, while LSA and SAS are explicitly referenced herein, the following descriptions are demonstrative in nature and may apply in any network scenario where a communication device is detecting radio activity on a plurality of carrier channels (in particular for LTE carrier channels).

In SAS systems, general users may thus need to check if the SAS band is vacant (free of incumbent/priority radio activity) before starting any transmission. Detection of incumbent usage may be relatively straightforward, as the SAS may directly inform general users of incumbent activity e.g. through interaction with the ESC. Even if such information is not available, general users may still be able to easily detect incumbent usage via radio measurement (such as energy detection) given that incumbents may conventionally transmit with high power. However, detection of priority users may be more difficult on the account of the fact that a) the SAS will likely not inform general users of priority user activity, and b) priority user transmission power may be much lower than incumbent transmission power and thus more difficult to reliably detect.

Figure 3:
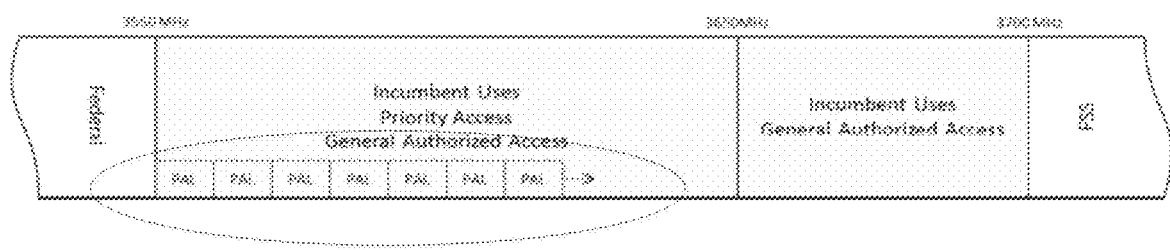
FIG. 3 shows a proposed bandplan in an SAS network.

Accordingly, general users may need to utilize specialized processing techniques in order to detect priority user activity in the shared band. As specified by the Federal Communications Commission (FCC) in "Report and Order and Second Further Notice of Proposed Rulemaking", (Apr. 21, 2015, FCC 15-47, referred to herein as "FCC SAS") potential SAS bandplans may allocate a portion of the SAS band that contains dedicated PAL channels while apportioning the remainder of the SAS band for incumbents and GAA users. FIG. 3 shows "FIG. 1: Potential Bandplan" (p. 22 of "FCC SAS"), which depicts an exemplary proposed SAS bandplan. As shown in FIG. 1, a portion of the SAS band may contain a plurality of PAL channels, which may each have e.g. a 10 MHz and number e.g. 7 in total. Accordingly, priority users may be able to enjoy exclusive access to such priority channels in the absence of incumbent activity while general users may be prohibited from accessing any priority channels that are occupied by either incumbents or priority users.

While general users may have a priori knowledge which frequency ranges of the SAS band are allocated for priority channels, general users may need to actively perform sensing in order to determine whether the priority channels are currently being utilized or not. As previously noted, detection of incumbent usage may be straightforward; however, detection of priority users may require specialized signal processing in order to reliably determine whether a given priority channel is actively being utilized by a priority user.

In a conventional solution, a general user (which may be a base station/access point, user terminal, dedicated sensing node, etc.) may sequentially process each of the priority channels in order to determine whether each priority channel is vacant, i.e. free of priority user activity. For example, a general user may receive data on a given priority channel, process the received data using specialized detection processing to detect any priority activity, and move on to similarly process the next priority channel to detect priority activity on this next priority channel. However, such sequential processing may be time-consuming and, as a result, require considerable power. Such may be particularly problematic for sensing procedures implemented at mobile terminals, which may be constrained by battery power limits.

In an advantageous solution of this disclosure, a general user aiming to detect priority activity on a plurality of carrier channels may instead perform specialized joint processing on signal data aggregated from each of the plurality of carrier channels. The general user may process the aggregated signal data in order to detect reference sequences on each of the carrier channels, thus indicating the active presence of a priority user on each carrier channel. As a result, the general user may perform parallel detection on the plurality of carrier channels and avoid having to individually process each of the plurality of carrier channels in sequence, thus conserving both time and power.

Figure 4:
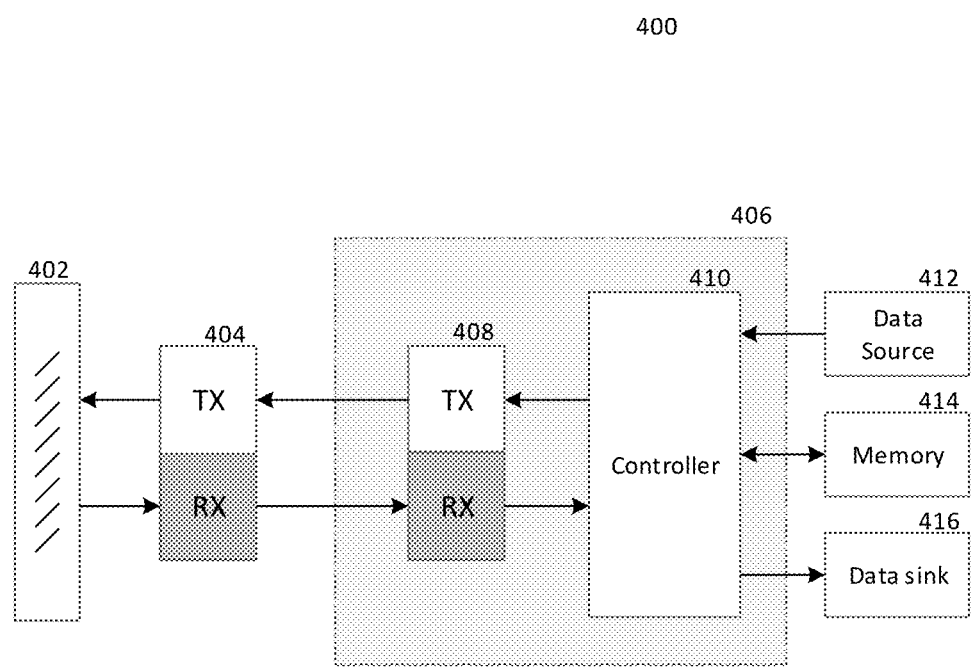
FIG. 4 shows an internal configuration of a mobile terminal.

As shown in FIG. 4, communication device 400 may include antenna system 402, radio frequency (RF) transceiver 404, baseband circuit 406 (including physical layer processing circuit 408 and controller 410), data source 412, memory 414, and data sink 416. Although not explicitly shown in FIG. 4, communication device 400 may include one or more additional hardware, software, and/or firmware components (such as processors/microprocessors, controllers/microcontrollers, other specialty or generic hardware/processors/circuits, etc.), user input/output devices (display(s), keypad(s), touchscreen(s), speaker(s), external button(s), camera(s), microphone(s), etc.), peripheral device(s), memory, power supply, external device interface(s), subscriber identify module(s) (SIMs), etc. Communication device 400 may be structurally configured as an uplink or a downlink node, such as either a mobile terminal or a base station in a cellular radio network context. Alternatively, communication device 400 may be structurally configured as a dedicated sensing node for detecting radio activity, in which case communication device 400 may not include transmission components and may instead only include reception components.

In abridged operational overview, communication device 400 may transmit and receive wireless signals on one or more radio communication networks. Baseband circuit 406 may direct such communication functionality of communication device 400 according to the communication protocols associated with each radio communication network, and may execute control over antenna system 402 and RF transceiver 404 in order to transmit and receive radio signals according to the formatting and scheduling parameters defined by each communication protocol.

Baseband circuit 406 may transmit and receive radio signals with antenna system 402, which may be a single antenna or an antenna array composed of multiple antennas and may additionally include analog antenna combination and/or beamforming circuitry. In the receive path (RX), RF transceiver 404/RX may receive analog radio frequency signals from antenna system 402 and perform analog and digital RF front-end processing on the analog radio frequency signals to produce digital baseband samples (e.g. In-Phase/Quadrature (IQ) samples) to provide to baseband circuit 406. RF transceiver 404/RX may accordingly include analog and digital reception circuitry including amplifiers (e.g. a Low Noise Amplifier (LNA), filters, RF demodulators (e.g. an RF IQ demodulator), and analog-to-digital converters (ADCs) to convert the received radio frequency signals to digital baseband samples. In the transmit path (TX), RF transceiver 404/TX may receive digital baseband samples from baseband circuit 306 and perform analog and digital RF front-end processing on the digital baseband samples to produce analog radio frequency signals to provide to antenna system 402 for wireless transmission. RF transceiver 404/TX may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband circuit 406 to produce the analog radio frequency signals for wireless transmission by antenna system 402. Baseband circuit 406 may control the RF transmission and reception of RF transceiver 404, including specifying the transmit and receive radio frequencies for operation of RF transceiver 404.

As shown in FIG. 4, baseband circuit 406 may include physical layer processing circuit 408, which may perform physical layer transmission and reception processing to prepare outgoing transmit data provided by controller 410 for transmission via RF transceiver 404/TX and prepare incoming received data provided by RF transceiver 404/RX for processing by controller 410. Physical layer processing circuit 408 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 408 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 4, physical layer processing circuit 408 may include a control circuit such as a processor configured to control the various hardware and software processing components of physical layer processing circuit 408 in accordance with physical layer control logic defined by the communications protocol for the relevant radio access technologies.

Communication device 400 may be configured to operate according to one or more radio access technologies, which may be directed by controller 410. Controller 410 may thus be responsible for controlling the radio communication components of communication device 400 (antenna system 402, RF transceiver 404, and physical layer processing circuit 408) in accordance with the communications protocol of each supported radio access technology, and accordingly may represent the data link layer (Layer 2) and network layer (Layer 3) of each supported radio access technology. Controller 410 may be structurally embodied as a protocol processor configured to execute protocol software and subsequently control the radio communication components of communication device 400 in order to transmit and receive communication signals in accordance with the corresponding protocol control logic. Although shown as a single entity in FIG. 4, controller 410 may be composed of multiple controllers, such as e.g. multiple dedicated controllers with each dedicated controller (e.g. protocol processor) corresponding to one or more of the supported radio access technologies. One or more of antenna system 402, RF transceiver 404, and physical layer processing circuit 408 may be similarly partitioned into multiple dedicated components each corresponding to one or more of the supported radio access technologies. Depending on the specifics of each such configurations and the number of supported radio access technologies, controller 410 may be configured to control the radio communication operations of communication device 400 in accordance with a master/slave RAT hierarchical or multi-SIM scheme.

Communication device 400 may further comprise data source 412, memory 414, and data sink 416, where data source 412 may include all sources of communication data above the network layer(s) of controller 410 (i.e. above Layer 3) and data sink 412 may include all destinations of communication data above the network layer(s) of controller 410 (i.e. above Layer 3). Such may include, for example, an application processor of communication device 400, which may be configured to execute various applications and/or programs of communication device 400, such as e.g. an Operating System (OS), a User Interface (UI) for supporting user interaction with communication device 400, and/or various user applications. The application processor may interface with baseband circuit 406 (as data source 412/data sink 416) to transmit and receive user data such as voice data, video data, messaging data, application data, basic Internet/web access data, etc., over a the radio network connection(s) provided by baseband circuit 406. Data source 412 and data sink 416 may additionally represent various user input/output devices of communication device 400, such as display(s), keypad(s), touchscreen(s), speaker(s), external button(s), camera(s), microphone(s), etc.

Memory 414 may comprise a memory component of communication device 400, such as e.g. a hard drive or another such permanent memory device. Although not explicitly depicted in FIG. 4, the various other components of communication device 400 shown in FIG. 4 may additionally each include integrated permanent and non-permanent memory components, such as for storing software program code, buffering data, etc.

Communication device 400 may be a general user device, such as a GAA user terminal, a GAA base station/wireless access point, or a GAA dedicated sensing node. Communication device 400 may be configured to operate on cellular networks, such as e.g. LTE networks, or may be configured to operate on short range networks such e.g. Bluetooth or WiFi. In addition to other communication functions, communication device 400 may be configured to perform detection on priority channels of a shared spectrum system in order to detect whether any priority users are actively using any of the priority channels. As previously noted, communication device 400 may implement specialized processing in order to perform joint detection on a plurality of priority channels in parallel, thus allowing communication device 400 to conserve time and power compared to a conventional 'sequential' detection procedure.

Figure 5:
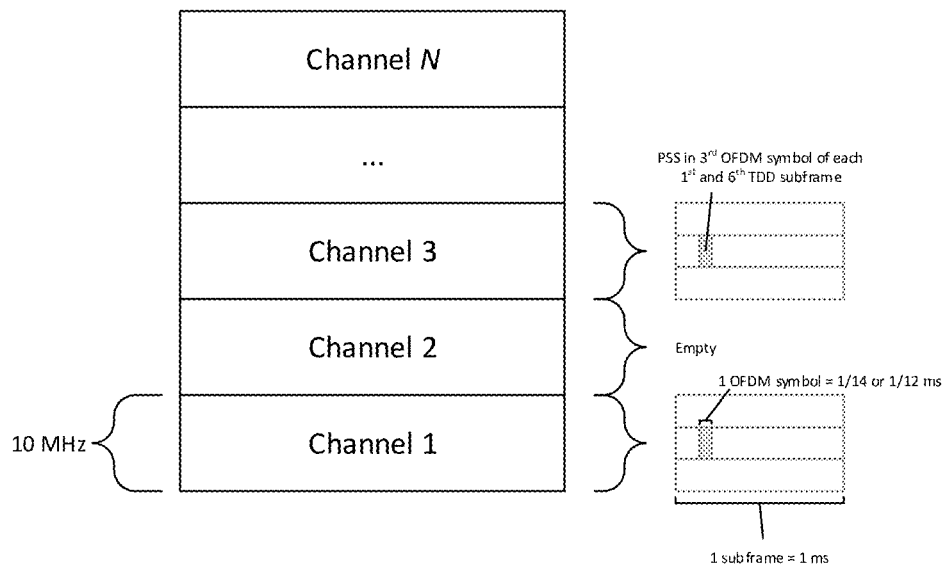
FIG. 5 shows a priority user channel allocation for a SAS network.

Given the prevalence of LTE as the high-speed cellular network of choice, communication device 400 may assume that the priority users are operating LTE networks in the priority channels. Accordingly, each of the priority channels may either contain an active LTE network or be empty (i.e. contain only noise and/or interference). FIG. 5 shows a depiction of the priority channels for a SAS band containing N priority channels each having a 10 MHz bandwidth. As shown in FIG. 5, each of the priority channels may be adjacent in frequency, thus occupying a bandwidth totaling 10N MHz. In the exemplary scenario of FIG. 5, priority channels 1 and 3 may be actively being utilized by priority users as LTE networks while priority channel 2 may be empty. Accordingly, priority channels 1 and 3 may contain LTE transmission signals while channel 2 may only contain noise and interference residue. This exemplary scenario is demonstrative and may be extended to any combination of active and empty priority channels.

In accordance with LTE networks as specified by the $3^{rd}$ Generation Partnership Project (3GPP), the priority users may transmit downlink LTE signals that contain LTE synchronization signals. As defined in Section 6.11 of 3GPP Technical Specification 36.211, "Physical channels and modulation", V12.5.0 ("3GPP TS 36.211"), each LTE cell may broadcast both a Primary Synchronization Signal (PSS) sequence and a Secondary Synchronization Signal (SSS) sequence, which mobile terminals may utilize in order to both identify and establish synchronization with LTE cells. The PSS-SSS sequence pair broadcasted by each LTE cell may specify the Physical Cell Identity (PCI) of the cell, which may allow a mobile terminal to determine the PCI of detectable LTE cells by identifying the PSS and SSS sequence. Specifically, the PSS sequence index (out of the possible set of 3 predefined PSS sequences) may denote the physical-layer identity $N_{ID}^{(2)}$ while the SSS sequence index (out of the possible set of 168 predefined SSS sequences) may denote the physical-layer cell-identity group $N_{ID}^{(1)}$. The PCI $N_{ID}^{cell}$ may then be given as $N_{ID}^{cell}=3N_{ID}^{(1)}+N_{ID}^{(2)}$ thus allowing mobile terminals to obtain the PCI of a cell by identifying the specific PSS and SSS sequence pair transmitted by the cell. A mobile terminal may utilize the PCI in order to obtain further cell information (such as contained in System Information Blocks (SIBs)) and potentially establish a connection with a given cell.

As further specified in Section 6.11 of 3GPP TS 36.211, each PSS sequence may be a length-63 sequence generated from a frequency-domain Zadoff-Chu root sequence (where each of the three possible PSS sequences utilizes a different root, e.g. 25, 29, and 34) that is mapped to across the 63 central subcarriers (including a central DC subcarrier) of the system bandwidth during the aforementioned PSS symbol period. Each SSS sequence may be a length-63 frequency-domain pseudorandom noise sequence that is similarly mapped to the 63 central subcarriers during the aforementioned SSS symbol period. Both the PSS and SSS sequence may thus occupy a 1.08 MHz bandwidth in total. Each of the 3 possible PSS sequences and 168 possible SSS sequences are predefined, and thus may be known a priori by mobile terminals and subsequently applied by mobile terminals to compare with received PSS-SSS sequence pairs to identify the PSS-SSS sequence pair (and PCI) of each cell.

Each LTE cell may broadcast the PSS and SSS sequences according to a predefined transmission schedule. In particular, each LTE cell may transmit downlink signals over a periodic series of 10 ms radio frames, where each radio frame is divided into 10 subframes each of 1 ms duration. Each subframe may be divided into two slots which each contain either 6 or 7 symbol periods depending on the Cyclic Prefix (CP) length, thus resulting in 12 or 14 symbols per subframe. The exact location of PSS and SSS sequences within the radio frames of each LTE cell may depend on the duplex mode of the LTE cell, which may be either Frequency Division Duplexing (FDD) or Time Division Duplexing (TDD). FDD LTE cells may transmit PSS sequences in the last symbol period of the first slot ($6^{th}$ or $7^{th}$ symbol period of the first slot depending on CP length) and may transmit SSS sequences in the symbol period before the PSS. In contrast, TDD LTE cells may transmit PSS sequences in the $3^{rd}$ symbol period of the first slot of the $1^{st}$ and $6^{th}$ subframes of each radio frame while transmitting SSS sequences in the last symbol period of the second slot of the $0^{th}$ and 5th subframes ($6^{th}$ or $7^{th}$ symbol period of the second slot depending on CP length).

Assuming priority users are LTE users, each of the priority channels containing an LTE priority user may thus contain PSS and SSS sequences as broadcast by the active priority user while inactive priority channels may not contain any detectable PSS or SSS sequences. In the case where the priority users are synchronized, i.e. where the LTE networks of each active priority channel utilize synchronized broadcast schedules, the PSS and SSS sequences may occur at the same symbol periods in time. As shown in the exemplary scenario of FIG. 5, if the priority users on priority channels 1 and 3 are utilizing TDD LTE networks the PSS sequences may occur in the $3^{rd}$ OFDM symbol of each $1^{st}$ and $6^{th}$ TDD subframe. Such may be similarly shown for an FDD case, where the PSS sequences may occur in the last symbol ($6^{th}$ or $7^{th}$ depending on CP) of the first slot of the $0^{th}$ and $5^{th}$ subframes.

As each of the three possible PSS sequences ($N_{ID}^{(2)}$=0, 1, 2) are predefined, communication device 400 may have a priori knowledge of the set of possible PSS sequence. Accordingly, communication device 400 may utilize a local copy of each of the possible PSS sequences to compare with signals received on the priority channels in order to detect the presence of any PSS sequences, which, if detected, may indicate priority user activity. Furthermore, communication device 400 may rely on the synchronized occurrence of PSS sequences in order to perform joint priority user detection over multiple of the priority carrier channels in parallel. Communication device 400 may be able to perform detection of priority users operating LTE networks without necessarily having an LTE receiver.

In an abridged summary of the joint detection process, communication device 400 may first establish time synchronization with one of the priority carrier channels, and may thus identify the PSS timing location for all of the synchronized priority channels. Communication device 400 may obtain this timing synchronization by detecting a PSS sequence on at least one of the priority channels or by other means, such as e.g. receiving information that explicitly specifies time synchronization information for the priority carrier channels. After establishing time synchronization with one of the priority carrier channels, communication device 400 may receive signal data on the plurality of carrier channels during the PSS symbol period. As PSS sequences are transmitted on the central subcarriers of each active carrier channel, communication device 400 may isolate the signal data from these central subcarriers as 'candidate' PSS sequences, where the candidate PSS sequences of active priority channels will be valid PSS sequences and the candidate PSS sequences of inactive priority channels will not be valid PSS sequences, i.e. 'void' PSS sequences. Communication device 400 may aggregate the extracted PSS sequences into an aggregated sequence (either with subsampling or channel isolation, as will be detailed) and subsequently perform joint detection by comparing the aggregated sequence to a local detection sequence derived from the predefined PSS sequences to determine whether the aggregated sequence matches any of the predefined PSS sequences. Depending on the type of aggregation used, communication device 400 may evaluate the comparison results in order to determine which of the priority carrier channels triggered the match between the aggregated sequence and the local PSS sequence copies, thus allowing communication device 400 to determine which priority channels are active (produce a match with the local PSS sequence copies) or are inactive (do not produce a match with the local PSS sequence copies).

Communication device 400 may perform the processing for the joint detection process introduced above in physical layer processing circuit 208, where antenna system 202 and RF transceiver 204 may receive radio frequency signals and produce baseband signals (i.e. IQ samples) for physical processing circuit 208 to process. As will be detailed, physical layer processing circuit 208 may perform the joint detection process on such baseband signals and obtain detection results that specify which of the priority carrier channels are active and which are vacant, i.e. which do not contain active priority users. Physical layer processing circuit 208 may either locally apply these detection results (e.g. at a control of physical layer processing circuit 208) or report the detection results to upper layers, such as controller 210. Based on the detection results, controller 210 may decide which of the priority carrier channels are available for use by communication device 400, e.g. for transmitting and/or receiving radio data. Alternatively, if communication device 400 is a sensing node, communication device 400 may report the detection results to another device such as a base station/network access point, which may allow the base station/network access point to determine which shared spectrum channels are available for access.

Figure 6:
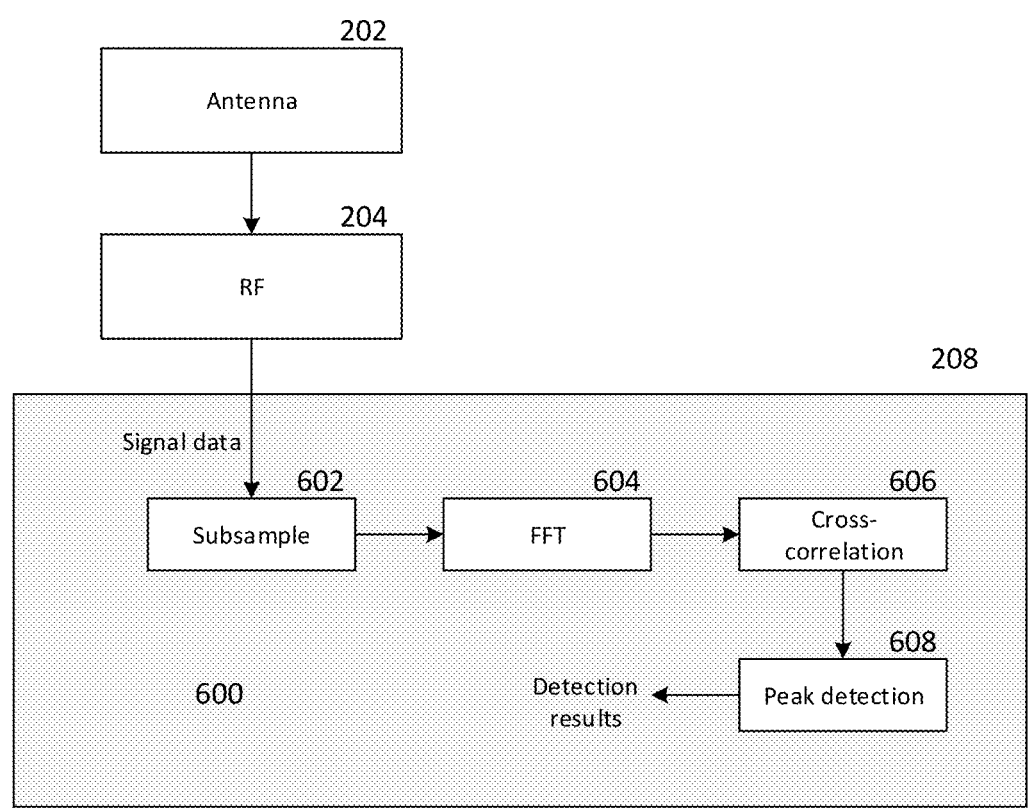
FIG. 6 shows a first priority user detection circuitry configuration.
Figure 7:
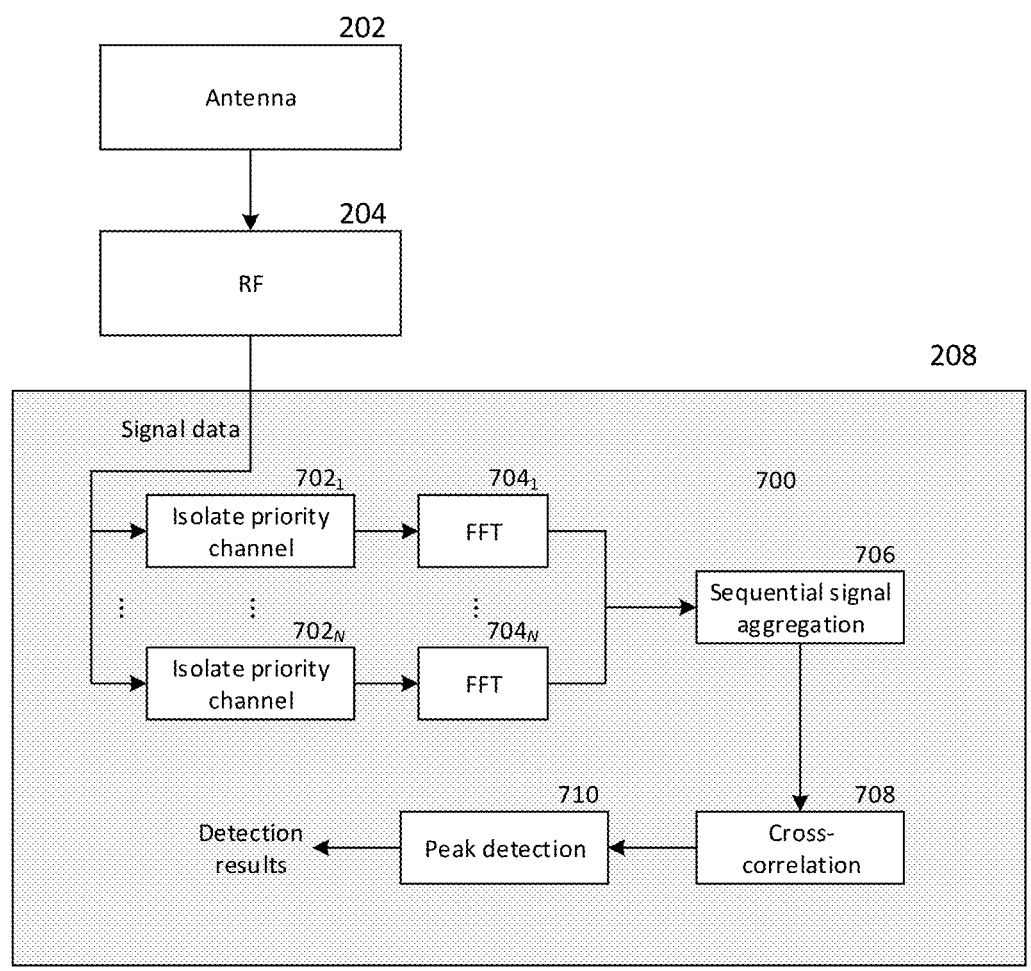
FIG. 7 shows a second priority user detection circuitry configuration.
Figure 8:
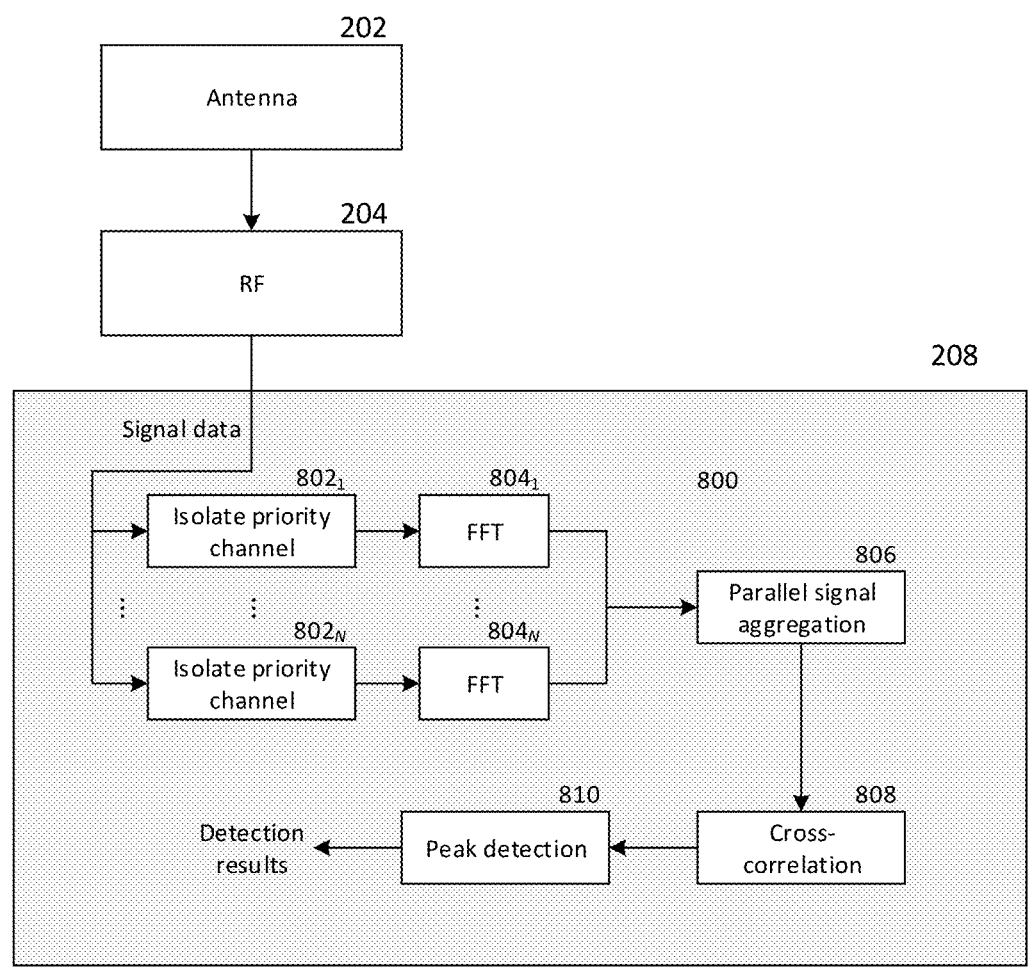
FIG. 8 shows a third priority user detection circuitry configuration.

FIGS. 6-8 show three different internal configurations of physical layer processing circuit 208 which may equip physical layer processing circuit 208 to perform the joint priority channel detection procedure. The configurations depicted in FIGS. 6-8 focus on the circuitry involved for the joint priority channel detection procedure and may omit other components of physical layer processing circuit 208 in addition to control, power, and clock lines in order to maintain drawing clarity. The corresponding functionality of the components of detection circuitry 600, 700, and 800 be structurally realized/embodied as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic.

As shown in FIG. 6, detection circuitry 600 of physical layer processing circuit 208 may include subsampling circuit 602, FFT circuit 604, cross-correlation circuit 606, and peak detection circuit 608. Antenna system 202 and RF transceiver 204 may receive radio signals and provide baseband signal data to physical layer processing circuit 208. In the context of detection circuitry 600, RF transceiver 204 may provide subsampling circuit 602 with a wideband time-domain signal y(t) that contains the PSS symbol period of N priority carrier channels. In other words, RF transceiver 204 may provide y(t) to $|subsampling|_{[SM1]}$ circuit 602 where y(t) is one symbol period in duration and has bandwidth of 10N MHz that each of the N priority channels.

Figure 9:
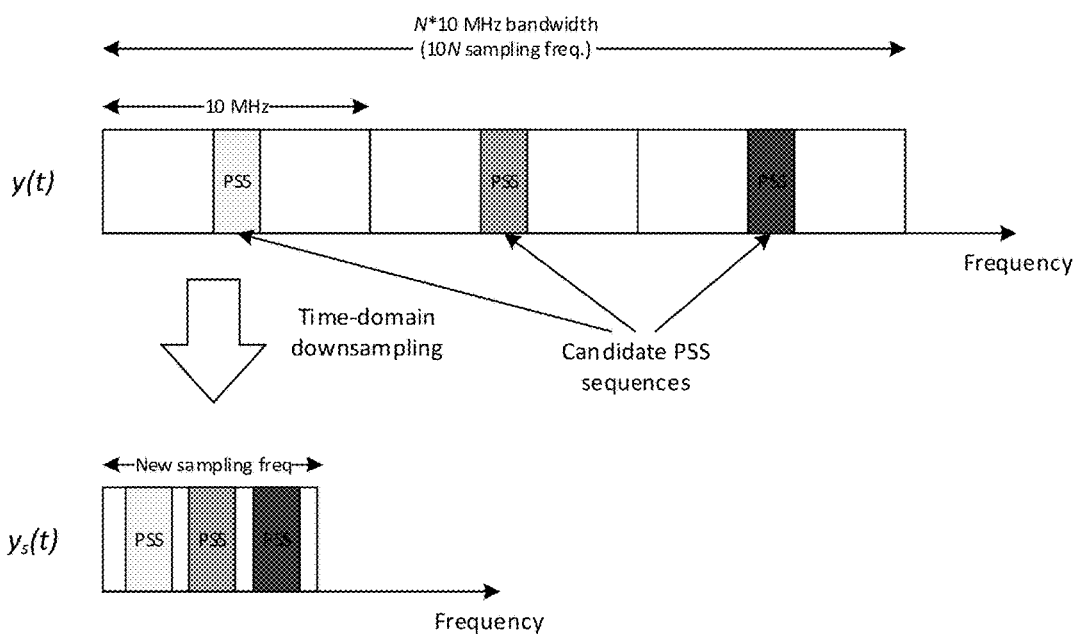
FIG. 9 shows a first frequency-domain diagram of downsampling.

FIG. 9 shows an exemplary frequency-domain depiction of wideband time-domain signal y(t) for N=3, where y(t) is a baseband symbol of one symbol period in duration that contains the PSS symbol period of 3 synchronized PAL channels and has a bandwidth of 30 MHz. Accordingly, as shown in FIG. 9, y(t) may contain a 'candidate' PSS sequence $w_i(k)$, $k=0, 1, \ldots, N_{ZC}-1$ with $N_{ZC}$ as the length of each PSS sequence in the frequency domain, for each i-th priority channel of the N total priority channels. The candidate PSS sequences $w_i(k)$, $i=1, \ldots, N$ may thus be located in the central 63 subcarriers of each priority channel. The candidate PSS sequence $w_i(k)$ of each priority channel may either be a valid PSS sequence, i.e. if the priority channel contains an active priority user, or a void PSS sequence, i.e. if the priority channel does not contain an active priority user. Returning to the exemplary scenario of FIG. 5 in which priority channels 1 and 3 are active and priority channel 2 is inactive, y(t) may contain valid PSS sequences as the respective candidate PSS sequences $w_1(k)$ and $w_3(k)$ for priority channels 1 and 3 and a void PSS sequence as the candidate PSS sequence $w_2(k)$ for priority channel 2.

Detection circuitry 600 may thus process y(t) in order to determine whether each of the PSS candidate sequences $w_i(k)$ of y(t) is a valid or void PSS sequence and, based on the determination, determine whether each priority channel is active or not.

Figure 10:
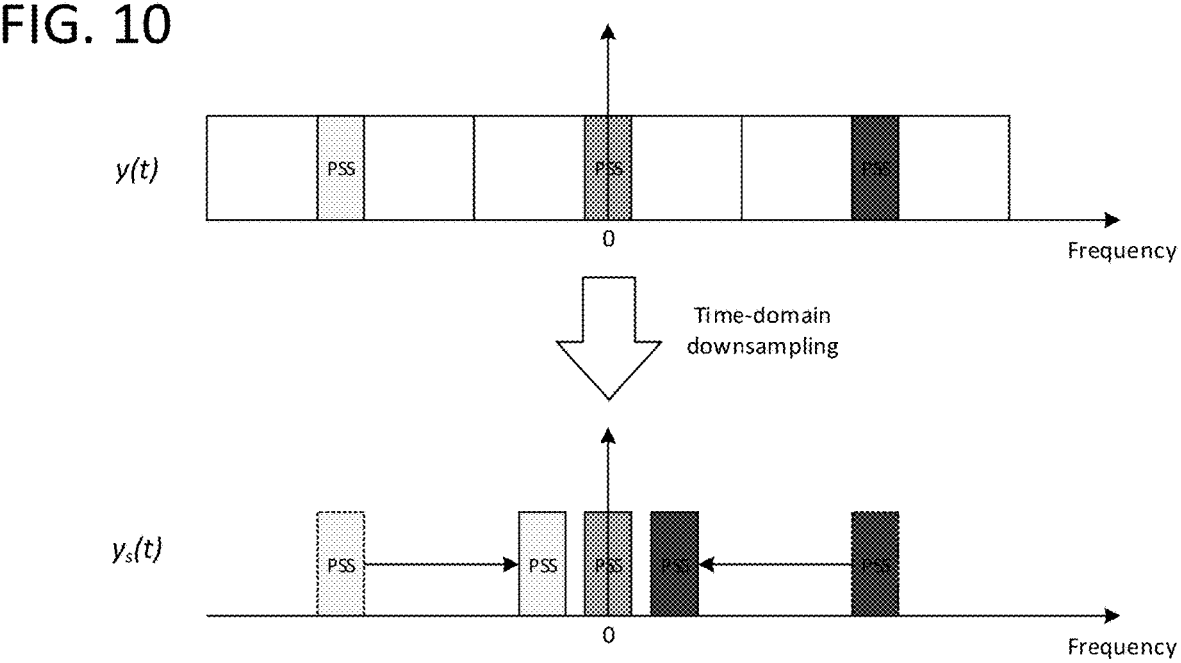
FIG. 10 shows a second frequency-domain diagram of downsampling.

As each of the candidate PSS sequences $w_i(k)$ are separated in frequency but overlapping in time, detection circuit 600 may perform the joint detection processing in the frequency-domain. However, as y(t) is a wideband signal, e.g. 30 MHz for priority channels 1-3, converting y(t) to a frequency-domain signal may be computationally intensive and require a very high-point FFT in order to preserve the frequency resolution of y(t) needed to evaluate the data on each subcarrier. Accordingly, as opposed to directly processing y(t), detection circuitry 600 may subsample y(t) with subsampling circuit 602 at a sampling rate $\alpha$ lower than the Nyquist rate $\alpha_{Ny}$, which is twice the highest frequency of the signal being sampled. As subsampling circuit 602 samples y(t) with rate $\alpha$ less than the Nyquist rate, the subsampling may create aliasing and shift the signals from each of the priority carrier channels closer to one another in frequency in the resulting subsampled signal $y_s(t)$. An exemplary depiction is shown in FIG. 10 where the signal from priority channel 2 is located at baseband and the subsampling by |subsampling|$_{[SM2]}$ circuit 602 shifts the signals from priority channels 1 and 3 adjacent to the signal from priority channel 1. While the aliasing may result in the signals from the priority channels overlapping, the subsampling rate $\alpha$ may be selected such that the candidate PSS sequences $w_i(k)$ (the central 63 subcarriers of the signals from each priority channel) do not overlap and instead fall adjacent to one another in the frequency domain of $y_s(t)$ as shown in FIGS. 9 and 10.

Due to the special zero-correlation properties of Zadoff-Chu sequences, the aliasing in $y_s(t)$ may not impact the ability to detect valid PSS sequences in $y_s(t)$ as long as the subsampling rate $\alpha$ is selected such that the candidate PSS sequences $w_i(k)$ do not overlap in frequency in $y_s(t)$. Furthermore, due to the subsampling operation of subsampling circuit 602, the frequency range of $y_s(t)$ that contains the candidate PSS sequences $w_i(k)$ from each of the N priority channels is significantly narrower than in $y_s(t)$, where each candidate PSS sequence $w_i(k)$ is separated by the 10 MHz channel bandwidth. The subsampling rate $\alpha$ may need to be selected as a) a positive integer, and b) such that the subsampling can be performed through a selection of a subset of time-domain samples, i.e. the number of subcarriers per symbol divided by subsampling rate $\alpha$ must produce an integer value. For example, given a 64-sub carrier symbol, a subsampling rate of $\alpha=4$ is possible since the corresponding symbol can be created by choosing one out of every 4 time domain OFDM samples; however, a subsampling rate of $\alpha=5$ would not be possible for the 64-subcarrier symbol as 64/5 is not an integer. Accordingly, subsampling circuit 602 may implement the subsampling rate by simply selecting every $\alpha$-th sample of y(t) as the samples of $y_s(t)$. As shown in FIGS. 9 and 10, some separation in frequency between the candidate PSS sequences $w_i(k)$ in $y_s(t)$ may be present, e.g. due to the prime-number length of 63 of the candidate PSS sequences $w_i(k)$. The selection of $\alpha$ may depend on N, as smaller selection of $\alpha$ may be needed for larger-bandwidth signals that contain a higher number N of priority channels.

Subsampling circuit 602 may thus produce $y_s(t)$ with a contracted bandwidth compared to $y_s(t)$; however, as noted above the candidate PSS sequences $w_i(k)$ of $y_s(t)$ may be preserved. Subsampling circuit 602 may then provide $y_s(t)$ to FFT circuit 604 for conversion to the frequency domain. FFT circuit 604 may then apply an FFT to $y_s(t)$ to obtain frequency-domain signal y(k) for $k=0, 1, \ldots, N_{FFT}-1$ where $N_{FFT}$ gives the FFT size. As $y_s(t)$ has lower bandwidth than y(t), $N_{FFT}$ may be considerably less (depending on the selection of $\alpha$) than the FFT size that would be required to apply an FFT to y(t).

Detection circuitry 600 may thus obtain y(k) as the $N_{FFT}$-length frequency-domain representation of $y_s(t)$. Depending on the selection of $\alpha$, $N_{FFT}$ for the exemplary N=3 case may be approximately 200 and may thus contain each of the length-63 candidate PSS sequences $w_i(k)$ of priority channels 1-3 placed adjacent to one another (with several null samples at the beginning and end of each candidate PSS sequence $w_i(k)$). Detection circuitry 600 may then compare y(k) to a local composite detection sequence derived from the three predefined PSS sequences ($N_{ID}^{(2)}=0, 1, 2$) that is correlated with each of the predefined PSS sequences in order to determine whether any of the candidate PSS sequences $w_i(k)$ of y(k) is correlated with any of the three predefined PSS sequences.

In a basic solution, cross-correlation circuitry 606 may calculate the cross-correlation between y(k) and each of the predefined PSS sequences $r_0(k)$, $r_1(k)$, and $r_2(k)$, each respectively corresponding to the $N_{ID}^{(2)}=0, 1, 2$ predefined PSS sequences defined for $k=0, 1, \ldots, N_{ZC}-1$ where $N_{ZC}$ is the length of the predefined PSS sequences in frequency. However, as detection circuitry 600 is only interested in whether each priority channel correlates any of the predefined PSS sequences (as opposed to identifying which specific PSS sequence each priority channel correlates to), cross-correlation circuitry 600 may aggregated the correlation process and cross-correlate y(k) with a single composite detection sequence $r_{ud}(k)$ derived from $r_0(k), r_1(k)$, and $r_2(k)$.

Composite detection sequence $r_{ud}(k)$ may be generated from an original characterization sequence r(k) equal to the sum of $r_0(k), r_1(k)$, and $r_2(k)$, i.e. $r(k)=r_0(k)+r_1(k)+r_2(k)$ for $k=0, 1, \ldots, N_{ZC}-1$. An inverse FFT (IFFT) may then be applied to r(k) to translate to the time domain, after which the resulting time-domain representation of r(k) may be subsampled with subsampling rate $\alpha$ and converted back to the frequency-domain with a forward FFT to produce $r_{ud}(k)$. This generation of $r_{ud}(k)$ may be performed offline and programmed into cross-correlation circuit 606, i.e. into a permanent memory of cross-correlation circuit accessible for data retrieval. Other local detection sequences may be alternatively be utilized that are derived from $r_0(k), r_1(k)$, and $r_2(k)$ such that the local detection sequence is correlated with each of $r_0(k)$, $r_1(k)$, and $r_2(k)$.

During runtime, cross-correlation circuit 606 may retrieve local composite detection sequence $r_{ud}(k)$ and calculate the cross-correlation $y(k)*r_{ud}(k)$ between $y(k)$ and $r_{ud}(k)$ to obtain cross-correlation sequence $c(k)$ for $k=0, 1, \ldots, N_{ZC}+N_{FFT}-2$. Cross-correlation sequence $c(k)$ may thus indicate which length-$N_{ZC}$ sample blocks of $v(k)$ are correlated with $r_{ud}(k)$; accordingly, as $r_{ud}(k)$ is derived from the sum $r(k)$ of the three predefined PSS sequences $r_1(k)$, $r_2(k)$, and $r_3(k)$, sample locations in $y(k)$ that mark the beginning of a valid PSS sequence in $y(k)$ may produce a peak in $c(k)$ as the embedded valid PSS sequences will be correlated with $r_{ud}(k)$. Due to the zero-correlation properties of predefined PSS sequences $r_1(k)$, $r_2(k)$, and $r_3(k)$, a valid PSS sequence in $y(k)$ will produce a match with $r_{ud}(k)$ even though $r_{ud}(k)$ is derived as the sum of $r_1(k)$, $r_2(k)$, and $r_3(k)$.

Cross-correlation circuit 606 may then provide cross-correlation sequence $c(k)$ to peak detection circuit 608, which may analyze $c(k)$ in order to identify an peaks (local maxima) of $c(k)$ and, if yes, identify whether the peaks fall at a sample location in $c(k)$ that corresponds to the sample location of a candidate PSS sequence $w_i(k)$ in $y(k)$. If a peak in $c(k)$ falls at such a sample location, peak detection circuit 608 may determine that the corresponding priority channel contains a valid PSS sequence and is thus actively being used by a priority user. Accordingly, peak detection circuit 608 may detect each peak in $c(k)$ (e.g., each sample of $c(k)$ that has an amplitude exceeding a detection threshold) and cross-reference the sample locations of each peak with the location of each candidate PSS sequence $w_i(k)$ in $y(k)$. If a peak sample location matches with a candidate PSS sequence sample location, peak detection circuit 608 may determine that the corresponding priority channel is active and provide an indication of such in the detection results.

For example, $y(k)$ may be e.g. 200 samples in length ($N_{FFT}=200$), where each of the three length-63 candidate PSS sequences corresponding to priority channels 1-3 are located e.g. at sample indices k=2:64, k=67:129, and k=132:194 of $y(k)$ and where the remaining samples are null samples, i.e. do not contain any candidate PSS sequence samples. Peak detection circuit 608 may then identify peaks of $c(k)$ and determine whether any of the peaks fall at (or near, i.e. within a predefined number of samples) sample locations k=2, k=67, or k=132 of $c(k)$. Accordingly, where priority channels 1 and 3 are active and priority channel 2 is vacant, peak detection circuit 608 may detect peaks at k=2 and k=132 of $c(k)$ but no peak at k=67. Accordingly, peak detection circuit 608 may determine that the candidate PSS sequences $w_1(k)$ and $w_3(k)$ for priority channels 1 and 3 are valid PSS sequences and the candidate PSS sequence $w_2(k)$ for priority channel 2 is a void PSS sequences. As a result, peak detection circuit 608 may determine that priority channels 1 and 3 are active while priority channel 2 is vacant.

Accordingly, detection circuitry 600 may perform joint detection on multiple priority channels in parallel. By performing subsampling at subsampling circuit 602, detection circuitry 600 may align the candidate PSS sequences $w_i(k)$ of each priority channel proximate to one another (e.g. 'aggregate' the candidate PSS sequences to a common frequency location) in the frequency domain of $a(n)$ and thus reduce the bandwidth of the signal that needs to be evaluated for peaks. Detection circuitry 600 may then perform a reduced-size FFT on the resulting signal and evaluate the resulting signal to detect valid PSS sequences. As previously detailed, such may conserve both time and power. The number of priority channels evaluated in the joint detection process may be scaled to any number of priority channels.

Physical layer processing circuit 208 may alternatively be configured to perform the joint detection process with detection circuitry 700 as shown in FIG. 7, which may utilize a modified technique in order to aggregate candidate PSS sequences $w_i(k)$ of each of the N priority channels. As shown in FIG. 7, RF transceiver 204 may similarly provide physical layer processing circuit 208 with baseband wideband time domain signal $y(t)$ over one PSS symbol period, which may contain each of the N 10 MHz priority channel signals $y_1(t), \ldots, y_N(t)$ and the respective candidate PSS sequences $w_i(k)$ of each priority channel. RF transceiver 204 may alternatively provide each of the priority channel signals $y_1(t)$-$y_N(t)$ separately, e.g. over different PSS symbol periods, which may allow RF transceiver 204 to receive each 10 MHz signal separately as opposed to wideband.

Channel isolation circuits 702$_1$-702$_N$ may receive $y(t)$ and perform channel isolation to each respectively obtain priority channel signals $y_1(t)$-$y_N(t)$, e.g. by applying bandpass filtering to separately capture the 10 MHz bandwidth signal of each priority channel. As each of priority channel signals $y_1(t)$-$y_N(t)$ is only 10 MHz (as opposed to the 10N MHz bandwidth of $y(t)$), the frequency-domain transformation of priority channel signals $y_1(t)$-$y_N(t)$ may be computationally manageable; accordingly, FFT circuits 7041-704N may each perform a forward FFT on respective priority channel signals $y_1(t)$-$y_N(t)$ to obtain frequency-domain priority channel signals $y_1(k)$-$y_N(k)$ for $k=0, 1, \ldots, N_{FFT-1}$ where $N_{FFT}$ is the FFT size for a 10 MHz LTE signal. Each of the candidate PSS sequences $w_i(k)$ may similarly be located in the central 63 subcarriers of each frequency-domain priority channel signal $y_1(k)$-$y_N(k)$, and may be denoted as $w_1(k)$, $w_2(k), \ldots, w_N(k)$ for $k=0, \ldots, N_{ZC}-1$.

FFT circuits 7041-704N may then provide $y_1(k)$-$y_N(k)$ to sequential signal aggregation circuit 706, which may extract each of the candidate PSS sequences $w_1(k)$-$w_N(k)$ from $y_1(k)$-$y_N(k)$, respectively, by extracting the samples from the central 63 subcarriers of $y_1(k)$-$y_N(k)$. Sequential signal aggregation circuit 706 may then aggregate candidate PSS sequences $w_1(k)$-$w_N(k)$ to form aggregated candidate PSS sequence $a(n)$ as $a(n)=\{w_1(k), w_2(k), \ldots, w_N(k)\}$ for $n=0, 1, \ldots, N \cdot N_{ZC}-1$ and $k=0, 1, \ldots, N_{ZC}-1$. Accordingly, sequential signal aggregation circuit 706 may aggregate $w_1(k)$-$w_N(k)$ to fall adjacent to one another in $a(n)$.

Sequential signal aggregation circuit 706 may then provide $a(n)$ to cross-correlation circuit 708. Cross-correlation circuit 708 may similarly utilize local composite detection sequence $r(k)$ derived from predefined PSS sequences $r_1(k)$, $r_2(k)$, and $r_3(k)$ as detailed above to detect valid PSS sequences in $a(n)$ and, in doing so, determine whether each priority channel is active or not. As detection circuitry 700 may not utilize subsampling, cross-correlation circuit 708 may utilize $r(k)$ as opposed to $r_{ud}(k)$, and may calculate the cross-correlation $a(n) \cdot r(k)$ between $a(n)$ and $r(k)$ to obtain cross-correlation sequence $c(k)$ for $k=0, 1, (N+1) \cdot N_{ZC}-2$ and subsequently provide $c(k)$ to peak detection circuit 710.

Peak detection circuit 710 may then evaluate $c(k)$ to identify any peaks and, if peaks are identified in $c(k)$, determine whether the peaks occur at sample locations corresponding to the start of each candidate PSS sequence $w_1(k)$-$w_N(k)$ in $a(n)$, i.e. at sample indices $k=0, 63, \ldots$. If any peaks satisfy this criteria, peak detection circuit 710 may determine that the corresponding priority channel contains a valid PSS sequence and accordingly is active.

Physical layer processing circuit 208 may alternatively be configured with detection circuitry 800 as shown in FIG. 8 to perform the joint detection process. As shown in FIG. 8, channel isolation circuits $802_1$-$802_N$ may similarly process baseband wideband time-domain signal y(t) to obtain priority channel signals $y_1(t)$-$y_N(t)$, which may each be over one PSS symbol period and contain candidate PSS sequences $w_1(k)$-$w_N(k)$. FFT circuits 8041-804N may then each apply a forward FFT to the respective priority channel signal $y_1(t)$-$y_N(t)$ to obtain frequency-domain priority channel signals $y_1(k)$-$y_N(k)$ for k=0, 1, . . . , $N_{FFT-1}$ where $N_{FFT}$ is the FFT size for a 10 MHz LTE signal. FFT circuits 8041-804N may then provide $y_1(k)$-$y_N(k)$ to parallel signal aggregation circuit 806.

As opposed to sequentially aggregating the candidate PSS sequences $w_1(k)$-$w_N(k)$ respectively contained in each of $y_1(k)$-$y_N(k)$ as in detection circuitry 700, parallel signal aggregation circuit 806 may aggregate candidate PSS sequences $w_1(k)$-$w_N(k)$ laid on top of one another after applying a cyclic shift to each candidate PSS sequences $w_1(k)$-$w_N(k)$ to obtain a(n). Expressed mathematically, parallel signal aggregation circuit 806 may calculate $$a(n) = \sum_{i=1}^{N} w_i(k + \Delta k_i) \% N_{ZC}, n = 0, 1, ..., N_{ZC} - 1, \quad (1)$$

$$k = 0, 1, ..., N_{ZC} - 1$$

where $\Delta k_i$ is the cyclic shift applied to the candidate PSS sequence $w_i(k)$ of the i-th priority channel.

Parallel signal aggregation circuit 806 may then provide a(n) to cross-correlation circuit 808, which may calculate the cross-correlation a(n)*r(k) between a(n) and r(k) to obtain cross-correlation sequence c(k). Cross-correlation circuit 808 may then provide c(k) to peak detection circuit 810 for peak detection.

As the PSS sequences are uncorrelated with one another, the parallel aggregation may not corrupt the ability of peak detection circuit 810 to identify peaks in c(k). However, due to the cyclic shifts $\Delta k_i$ applied to each candidate PSS sequence $w_i(k)$ in a(n), the sample locations of potential cross-correlation peaks of c(k) may be shifted according to each respective $\Delta k_i$. For example, if a given $\Delta k_i$=3 was utilized for the i-th candidate PSS sequence $w_i(k)$, peak detection circuit 810 would need to check whether any detected peaks in c(k) occurred at (or near) sample index k=3 of c(k) to determine whether the i-th PSS candidate sequence produces a match with one of the predefined PSS sequences and is thus a valid PSS sequence. Accordingly, peak detection circuit 810 may identify any peaks in c(k) and check whether any of the peaks occur at sample locations of c(k) given by the cyclic shift values $\Delta k_i$, i=1, . . . , N in order to determine whether each i-th corresponding priority channel contains a valid PSS sequence. Peak detection circuit 810 may thus determine which priority channels have valid PSS sequences and consequently which priority channels are active (and thus are off-limits for access by general users).

While detailed above for parallel aggregation of all N candidate PSS sequences, parallel signal aggregation circuit 806 may instead only aggregate P<N candidate PSS sequences into a given a(n), e.g. P=2. Parallel signal aggregation circuit 806, cross-correlation circuit 808, and peak detection circuit 810 may then process a series of aggregated sequences a(n) where each a(n) yields detection for P of the N priority channels. Likewise, while detection circuitry 600 and 700 may be detailed above as being applied to all N priority channels, detection circuitry 600 and 700 may alternatively operate in blocks of P priority channels out of N total priority channels at a time.

Although any of detection circuitry 600, 700, and 800 may reliably perform the joint detection procedure, certain device configurations may be better suited for a specific configuration. For example, realizations of communication device 400 as a hardware receiver, e.g. with a large amount of ASICs, may be better suited for detection circuitry 600 as the subsampling and forward FFTs are done in sequence. Conversely, realizations of communication device 400 in with software-defined receivers may be better suited for detection circuitry 700 or 800 due to the ability to do the channel isolation and forward FFT in parallel.

As detailed in the previous descriptions of FIGS. 6-8, cross-correlation circuits 608, 708, and 808 may utilize a local composite detection sequence $r_{ud}(k)$ or r(k) that is derived from the sum of the three predefined PSS sequences $r_1(k)$, $r_2(k)$, and $r_3(k)$. As noted above, such may allow cross-correlation circuits 608, 708, and 808 and peak detection circuits 610, 710, and 810 to detect whether any of the candidate PSS sequences $w_1(k)$-$w_N(k)$ match with any of the three predefined PSS sequences. However, as the local composite detection sequences $r_{ud}(k)$ and r(k) are derived from the sum of the three predefined PSS sequences, peak detection circuits 610, 710, and 810 may not be able to uniquely identify which of the predefined PSS sequences triggers the match. In the event that physical layer processing circuit 208 aims to determine exactly which of the predefined PSS sequences triggers a match with the candidate PSS sequences $w_1(k)$-$w_N(k)$, cross-correlation circuits 608, 708, and 808 may individually calculate the cross-correlation between the aggregated sequence a(n) with each of the three predefined PSS sequences $r_1(k)$, $r_2(k)$, and $r_3(k)$ (subsampled versions in the case of detection circuitry 600) and detect peaks in each resulting cross-correlation function at peak detection circuits 610, 710, and 810 to specifically identify which predefined PSS sequence produces the match.

Alternatively, in order to expedite the detection process cross-correlation circuits 608, 708, and 808 may utilize cyclic shifts in an analogous fashion as to detailed above regarding parallel signal aggregation circuit 806. Specifically, instead of applying a cyclic shift to the candidate PSS sequences $w_1(k)$-$w_N(k)$, cross-correlation circuits 608, 708, and 808 may utilize cyclically shifted versions of the predefined PSS sequences in r(k), where each of $r_1(k)$, r(k), and $r_3(k)$ is shifted with a different cyclic shift. More specifically, r(k) may be derived (offline) as r(k)=$r_1(k-\Delta c_1)$+$r_2(k-\Delta c_2)$+$r_3(k-\Delta c_3)$, where of $\Delta c_1$, $\Delta c_2$, and $\Delta c_3$ give the cyclic shifts of each predefined PSS sequence $r_1(k)$, $r_2(k)$, and $r_3(k)$.

As the predefined PSS sequences are cyclically shifted in the local composite detection sequence r(k), cross-correlation peaks in c(k) may be located at different sample locations corresponding to $\Delta c_1$, $\Delta c_2$, and $\Delta c_3$ relative to the starting point of each candidate PSS sequence $w_1(k)$-$w_N(k)$ in a(n). Accordingly, peak detection circuits 610, 710, and 810 may offset the sample locations that are evaluated for peaks in c(k) by each of $\Delta c_1$, $\Delta c_2$, and $\Delta c_3$ in order to determine if any peaks exist at these sample locations and, if yes, uniquely identify which predefined PSS sequence produced the match according to the corresponding cyclic shift. The configuration detailed above without cyclic shifts may thus be equivalent to a special case of the cyclic shift configuration where each of $\Delta c_1$, $\Delta c_2$, and $\Delta c_3$ are set to 0.

This cyclic shift modification may be applied to any of detection circuitry 600, 700, and 800. As detection circuitry 800 may additionally apply a cyclic shift of $\Delta k_i$ to each i-th candidate PSS sequence $w_i(k)$ in $a(n)$, peak detection circuit 810 may need to search for peaks in multiple different sample locations, e.g. three different locations per i-th priority channel (one per predefined PSS sequence). The cyclic shift positions $\Delta c_1$-$\Delta c_3$ and $\Delta k_1$-$\Delta k_N$ may thus need to be carefully selected so that no peak search positions are overlapping, as such may prohibit peak detection circuit 810 from determining which candidate PSS sequence matched with which predefined PSS sequence.

Upon obtaining the detection results, physical layer processing circuit 208 may have knowledge of which of the priority channels are active and which are vacant. In the event that communication device 400 is configured as a mobile terminal or base station/network access point, communication device 400 may decide to access one or more of the vacant priority channels (assuming incumbents are also absent) by transmitting and/or receiving signals on the vacant channels. Alternatively, if communication device 400 is configured as a sensing node, communication device 400 may need to report to another entity, i.e. a user terminal or a base station/network access point, which priority channels are vacant, which may occur either through a wired or wireless connection depending on the setup of the sensing node.

Figure 11:
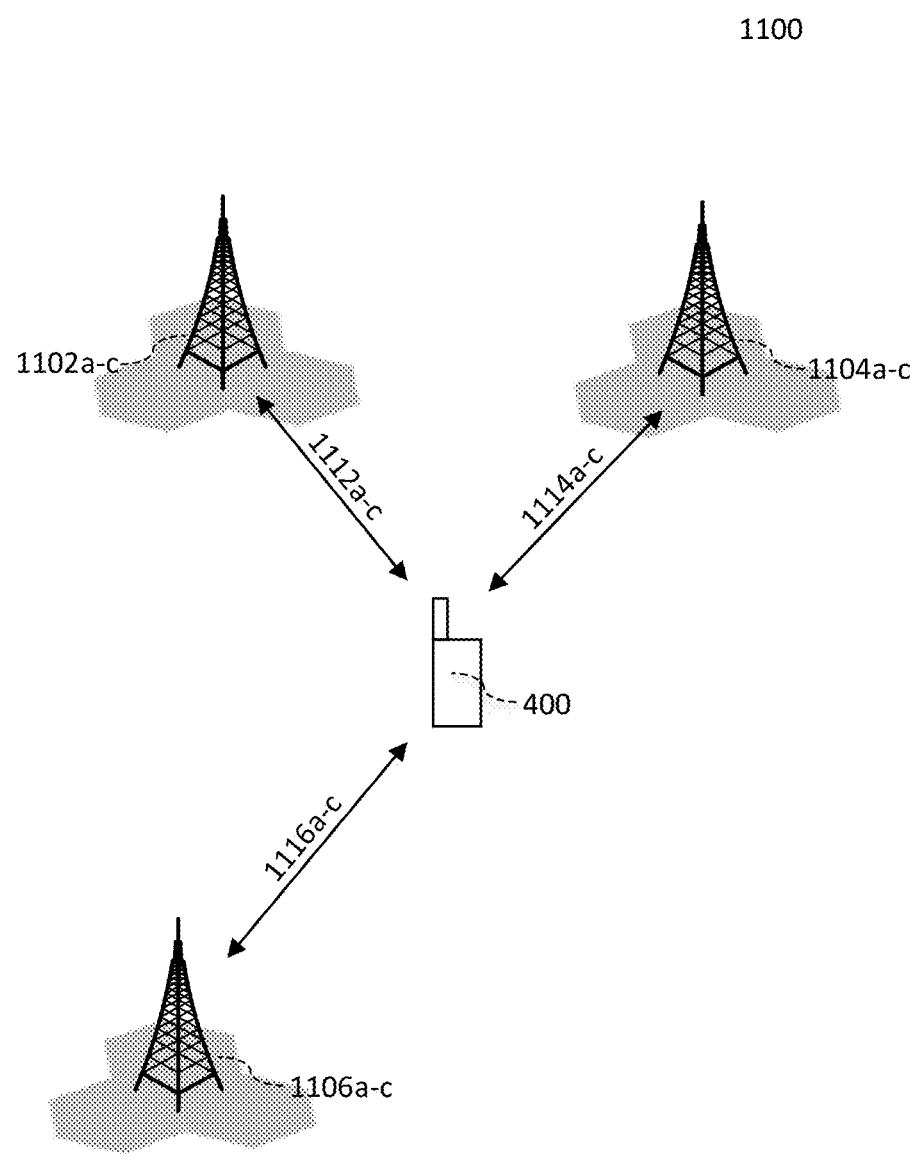
FIG. 11 shows a shared spectrum network.

FIG. 11 shows a system-level diagram of communication device 400 within radio communication network 1100, which may be a shared spectrum network including base stations 1102, 1104, 1106. Each of base stations 1102-1106 may be an LTE base station (eNodeB) and may be operated by a different priority user on a respective one of the priority channels. As denoted in FIG. 11, each of base stations 1102-1106 may sectorized and thus be composed of multiple cells, i.e. cells 1102a-c for base station 1102, cells 1104a-c for base station 1104, and cells 1106a-c for base station 1106. The unique radio channel between each of cells 1102a-c, 1104a-c, and 1106a-c and communication device 400 may be respectively denoted as channels 1112a-c, 1114a-c, and 1116a-c, with which communication device 400 may exchange uplink and/or downlink data with cells 1102a-1106c depending on the operational status of communication device 400.

Each of base stations 1102-1106 may be operated by a different MNO; accordingly, each of base stations 1102-1106 may be licensed a different priority channel (out of the N total priority channels) according to licensing agreements of each MNO as part of the spectrum sharing scheme. For example, each of base stations 1102-1106 may operate on a different PAL channel of a SAS scheme, where e.g. base station 1102 (i.e. all of cells 1112a-c) operates on PAL channel 1, base station 1104 (i.e. all of cells 1114a-c) operates on PAL channel 3, and base station 1106 (i.e. all of cells 1116a-c) operates on PAL channel 4. Each of base stations 1102-1106 may be time-synchronized with each other, and thus may transmit PSS sequences in the same symbol period.

Communication device 400 may be a communication device operating as part of general user network, such as a mobile terminal, base station, or dedicated sensing node of a GAA user of the SAS scheme. Accordingly, communication device 400 may need to detect whether any incumbent or priority users are utilizing the shared spectrum in order to determine whether the GAA user is permitted to access the shared spectrum. Accordingly, communication device 400 may trigger the joint detection process at physical layer processing circuit 208 in order to determine which, if any, priority channels are vacant. Communication device 400 may additionally utilize physical layer processing circuit 208 in order to detect whether incumbent users are present on the shared spectrum potentially as a pre-requisite for evaluating priority user activity.

Physical layer processing circuit 208 may be configured with one of detection circuitry 600, 700, or 800, and may accordingly perform the joint detection process on the N PAL channels with the concerned circuitry in order to detect which PAL channels are vacant. Communication device 400 may thus receive radio signals (either a single wideband signal or multiple narrowband signals in sequence at different times) with antenna system 402 and perform radio demodulation with RF transceiver 404 to provide the resulting baseband signals to physical layer processing circuit 208. Physical layer processing circuit 208 may then perform the downsampling, sequential, or parallel aggregation of the baseband signals in order to obtain aggregated candidate PSS sequence $y(k)$ or $a(n)$ containing the adjacent or overlapping candidate PSS sequences of each of the N PAL channels, including PAL channels 1-4. Physical layer processing circuit 208 may then calculate the cross-correlation between the aggregated candidate PSS sequence $y(k)$ or $a(n)$ and a local detection sequence $r_{ud}(k)$ or $r(k)$ (which is correlated with each of the predefined PSS sequenced $r_0(k)$, $r_1(k)$, and $r_2(k)$) to obtain a cross-correlation sequence $c(k)$. Physical layer processing circuit 208 may then evaluate $c(k)$ to identify any peaks in $c(k)$ and, if peaks are identified, determine whether the peaks occur at sample locations of $c(k)$ that correspond to sample locations of the candidate PSS sequences within the aggregated candidate PSS sequence $y(k)$ or $a(n)$.

As base stations 1102-1106 are operating on PAL channels 1, 3, and 4, respectively, the PSS sequences transmitted by each of base stations 1102-1106 may be detectable at communication device 400; accordingly, during the joint detection process physical layer processing circuit 208 may detect peaks in $c(k)$ at sample locations corresponding to the candidate PSS sequences of PAL channels 1, 3, and 4. Conversely, as no detectable priority user is actively using PAL channel 2, physical layer processing circuit 208 may not detect a peak in $c(k)$ corresponding to PAL channel 2. Consequently, the detection results may indicate the active presence of priority users on PAL channels 1, 3, and 4 but not indicate the presence of any priority users on PAL channel 2. Communication device 400 may thus conclude that PAL channels 1, 3, and 4 are prohibited while PAL channel 2 is available. As a result of performing the joint detection process instead of a sequential detection process, communication device 400 may conserve both time and power.

Figure 12:
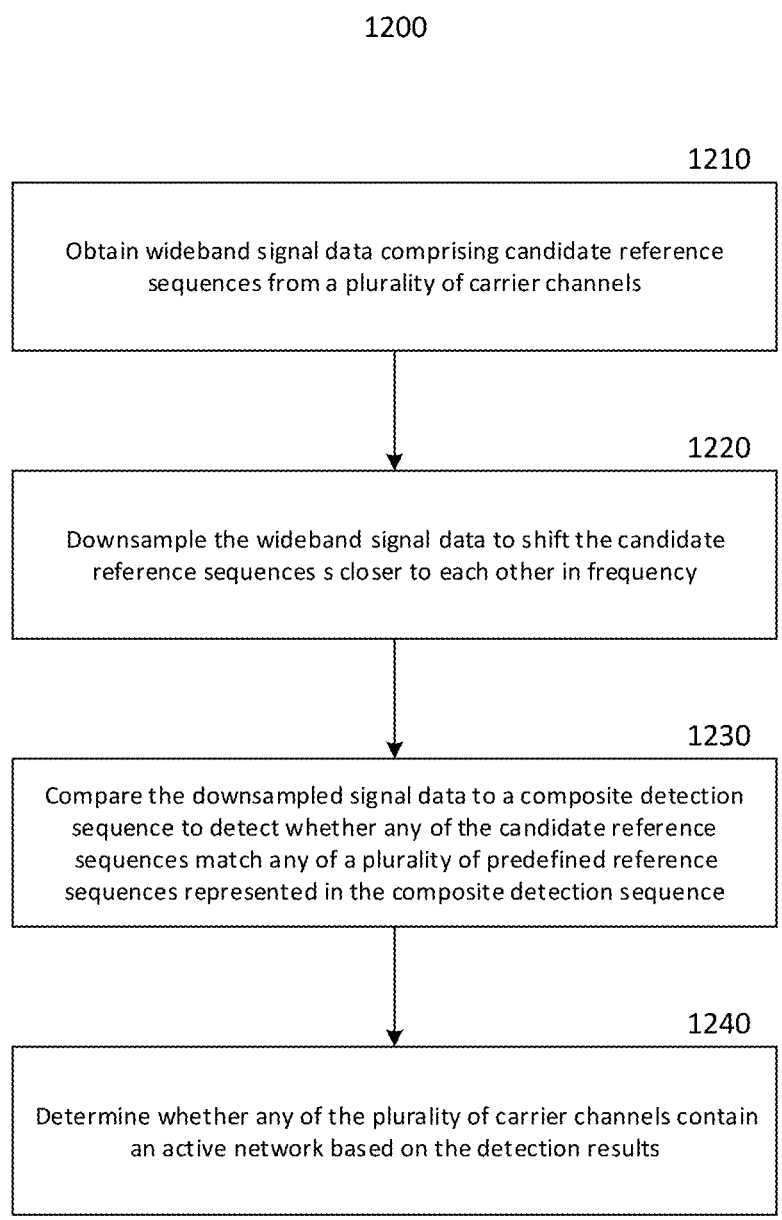
FIG. 12 shows a first method of detecting radio activity.

FIG. 12 shows method 1200 of detecting radio activity on carrier channels. As shown in FIG. 12, method 1200 includes obtaining wideband signal data including candidate reference sequences from a plurality of carrier channels (1210), downsampling the wideband signal data to shift the candidate reference sequences s closer to each other in frequency (1220), comparing the downsampled signal data to a composite detection sequence to detect whether any of the candidate reference sequences match any of a plurality of predefined reference sequences represented in the composite detection sequence (1230), and determining whether any of the plurality of carrier channels contain an active network based on the detection results (1240).

Figure 13:
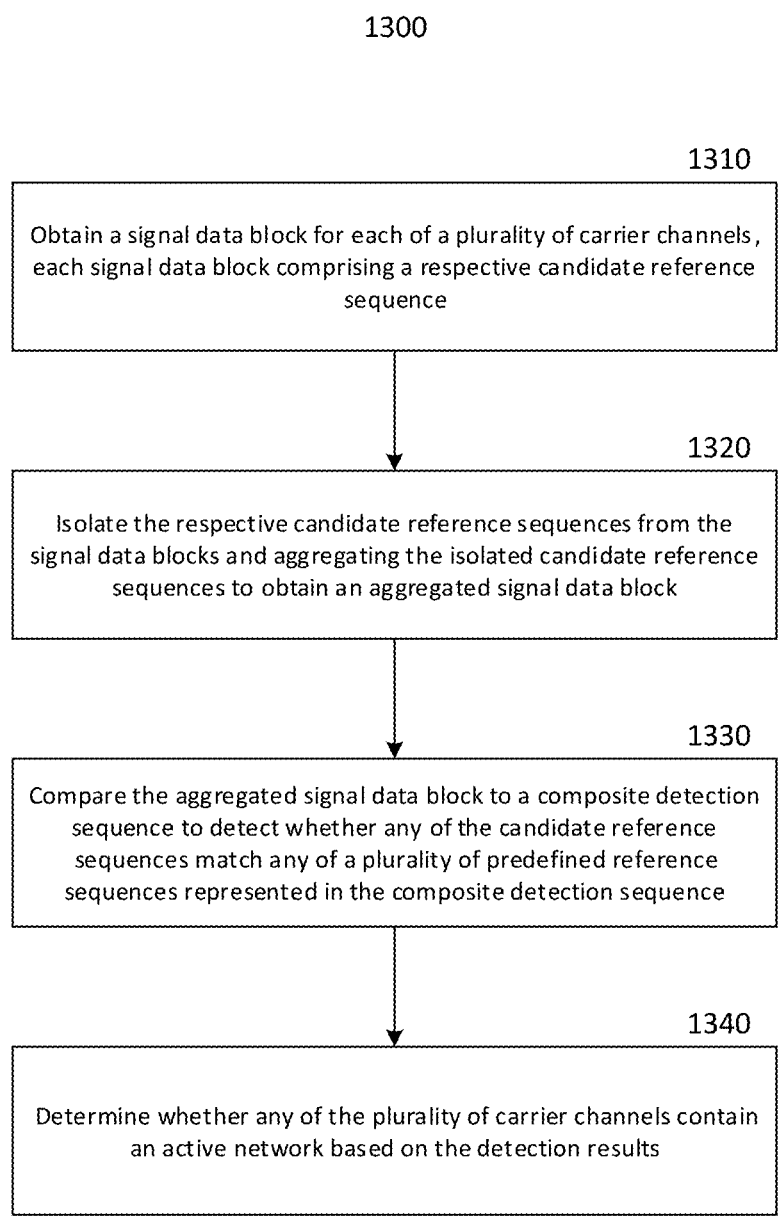
FIG. 13 shows a second method of detecting radio activity.

FIG. 13 shows method 1300 of detecting radio activity on carrier channels. As shown in FIG. 13, method 1300 includes a signal data block for each of a plurality of carrier channels, each signal data block including a respective candidate reference sequence (1310), isolating the respective candidate reference sequences from the signal data blocks and aggregating the isolated candidate reference sequences to obtain an aggregated signal data block (1320), comparing the aggregated signal data block to a composite detection sequence to detect whether any of the candidate reference sequences match any of a plurality of predefined reference sequences represented in the composite detection sequence (1330), and determining whether any of the plurality of carrier channels contain an active network based on the detection results (1340).

In one or more further exemplary aspects of the disclosure, one or more of the features described above in reference to FIGS. 1-11 may be further incorporated into method 1200 and/or 1300. In particular, method 1200 and/or 1300 may be configured to perform further and/or alternate processes as detailed regarding detection circuitry 600, 700, and/or 800.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate α single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a method of detecting radio activity on carrier channels, the method including obtaining wideband signal data including candidate reference sequences from a plurality of carrier channels, downsampling the wideband signal data to shift the candidate reference sequences s closer to each other in frequency, comparing the downsampled signal data to a composite detection sequence to detect whether any of the candidate reference sequences match any of a plurality of predefined reference sequences represented in the composite detection sequence, and determining whether any of the plurality of carrier channels contain an active network based on the detection results.

In Example 2, the subject matter of Example 1 can optionally include wherein the composite detection sequence is correlated with each of the predefined reference sequences.

In Example 3, the subject matter of Example 1 or 2 can optionally include wherein the composite detection sequence is a sum of the plurality of predefined reference sequences.

In Example 4, the subject matter of any one of Examples 1 to 3 can optionally include wherein the candidate reference sequences are separated by a first frequency distance in the wideband signal data and by a second frequency distance less than the first frequency distance in the downsampled signal data.

In Example 5, the subject matter of any one of Examples 1 to 4 can optionally include wherein obtaining the wideband signal data including candidate reference sequences from the plurality of carrier channels includes receiving a wideband radio signal across a collective bandwidth of the plurality of carrier channels, and converting the wideband radio signal to digital baseband to obtain the wideband signal data.

In Example 6, the subject matter of any one of Examples 1 to 5 can optionally include wherein determining whether any of the plurality of carrier channels contain an active network based on the detection results includes if one of the candidate reference sequences of the plurality of carrier channels matches the composite detection sequence, determining that the corresponding carrier channel of the plurality of carrier channels contains an active network.

In Example 7, the subject matter of any one of Examples 1 to 6 can optionally include wherein downsampling the wideband signal data to shift the candidate reference sequences closer to each other in frequency includes sampling the wideband signal data at a sampling rate less than the Nyquist rate of the wideband signal data.

In Example 8, the subject matter of any one of Examples 1 to 7 can optionally further include performing a frequency transform on the downsampled signal data to obtain frequency-domain signal data, wherein comparing the downsampled signal data to the composite detection sequence to detect whether any of the candidate reference sequences match any of the plurality of predefined reference sequences represented in the composite detection sequence includes comparing the frequency-domain signal data to the composite detection sequence.

In Example 9, the subject matter of Example 8 can optionally include wherein comparing the frequency-domain signal data to the composite detection sequence includes performing a cross-correlation between the frequency-domain signal data and the composite detection sequence to obtain a cross-correlation sequence.

In Example 10, the subject matter of Example 9 can optionally include wherein comparing the downsampled signal data to the composite detection sequence to detect whether any of the candidate reference sequences match any of the plurality of predefined reference sequences represented in the composite detection sequence includes comparing the frequency-domain signal data to the composite detection includes evaluating the cross-correlation sequence to determine whether any peak values of the cross-correlation sequence occur at predefined sample locations in the cross-correlation sequence, and if peak values are identified at any of the predefined sample locations, determining that one or more of the candidate reference sequences matches the composite detection sequence.

In Example 11, the subject matter of Example 10 can optionally include wherein the candidate reference sequences are located at predefined frequency locations in the frequency-domain signal data and wherein each of the predefined sample locations correspond to a respective predefined frequency location of one of the candidate reference sequences in the frequency-domain signal data.

In Example 12, the subject matter of Example 10 can optionally include wherein determining that one or more of the candidate reference sequences matches the composite detection sequence if peak values are identified at any of the predefined sample locations includes identifying a first peak value of the cross-correlation sequence, determining that the first peak value occurs at a predefined sample location of the cross-correlation sequence corresponding to a predefined frequency location of a first candidate reference sequence of the candidate reference sequences in the frequency-domain signal data, and determining that the first candidate reference sequence matches the composite sequence.

In Example 13, the subject matter of any one of Examples 1 to 12 can optionally include wherein determining whether any of the plurality of carrier channels contain an active network based on the detection results includes determining from the detection results which of the candidate reference sequences match the composite detection sequence, and determining that the carrier channels of the plurality of carrier channels corresponding to the matching candidate reference sequences contain active networks.

In Example 14, the subject matter of any one of Examples 1 to 5 can optionally include wherein the composite detection sequence is a frequency-domain sequence, and wherein comparing the downsampled signal data to the composite detection sequence to detect whether any of the candidate reference sequences match any of the plurality of predefined reference sequences represented in the composite detection sequence includes cross-correlating the composite detection sequence with a frequency-domain representation of the downsampled signal data to obtain a cross-correlation sequence and identifying whether any peaks in the cross-correlation sequence occur at sample locations associated with any of the candidate reference sequences.

In Example 15, the subject matter of Example 14 can optionally include wherein determining whether any of the plurality of carrier channels contain an active network based on the detection results includes if any peaks in the cross-correlation sequence occur at sample locations associated with any of the candidate reference sequences, determining that the carrier channels corresponding to the associated candidate reference sequences contain active networks.

In Example 16, the subject matter of Example 14 can optionally include wherein the composite detection sequence is a sum of cyclically-shifted versions of plurality of predefined reference sequences, and wherein comparing the downsampled signal data to the composite detection sequence to detect whether any of the candidate reference sequences match any of the plurality of predefined reference sequences represented in the composite detection sequence includes cross-correlating the composite detection sequence with a frequency-domain representation of the down-sampled signal data to obtain a cross-correlation sequence and identifying whether any peaks in the cross-correlation sequence occur at sample locations associated with any of the candidate reference sequences and the cyclic shifts of each cyclically-shifted version of the plurality of predefined reference sequences of the composite detection sequence.

In Example 17, the subject matter of any one of Examples 1 to 15 can optionally include wherein the candidate reference sequences are candidate Primary Synchronization Sequences (PSSs).

In Example 18, the subject matter of any one of Examples 1 to 17 can optionally include wherein determining whether any of the plurality of carrier channels contain an active network based on the detection results includes determining whether any of the plurality of carrier channels contain an active Long Term Evolution (LTE) network based on the detection results.

In Example 19, the subject matter of any one of Examples 1 to 18 can optionally include wherein the plurality of carrier channels are synchronized in time.

In Example 20, the subject matter of any one of Examples 1 to 19 can optionally include wherein the wideband signal data has a duration of the symbol period of the plurality of predefined reference sequences.

In Example 21, the subject matter of any one of Examples 1 to 20 can optionally include wherein the plurality of carrier channels are predefined shared spectrum channels.

In Example 22, the subject matter of Example 21 can optionally include wherein the plurality of carrier channels are Priority Access License (PAL) channels in a Spectrum Access System (SAS) network.

In Example 23, the subject matter of any one of Examples 1 to 22 can optionally further include if a first carrier channel of the plurality of carrier channels is determined to not contain an active network, accessing the first carrier channel.

Example 24 is a processing circuit arrangement configured to perform the method of any one of Examples 1 to 23.

Example 25 is a baseband modem configured to perform the method of any one of Examples 1 to 23.

Example 26 is a radio communication device configured to perform the method of any one of Examples 1 to 23.

Example 27 is a method of detecting radio activity on carrier channels, the method including obtaining a signal data block for each of a plurality of carrier channels, each signal data block including a respective candidate reference sequence, isolating the respective candidate reference sequences from the signal data blocks and aggregating the isolated candidate reference sequences to obtain an aggregated signal data block, comparing the aggregated signal data block to a composite detection sequence to detect whether any of the candidate reference sequences match any of a plurality of predefined reference sequences represented in the composite detection sequence, and determining whether any of the plurality of carrier channels contain an active network based on the detection results.

In Example 28, the subject matter of Example 27 can optionally include wherein the composite detection sequence is correlated with each of the plurality of predefined reference sequences.

In Example 29, the subject matter of Example 27 or 28 can optionally include wherein the composite detection sequence is a sum of the plurality of predefined reference sequences.

In Example 30, the subject matter of any one of Examples 27 to 29 can optionally include wherein isolating the candidate reference sequences from the signal data blocks includes performing a frequency transform on each of the signal data blocks to obtain frequency-domain signal data blocks, and selecting samples from each of the frequency-domain signal data blocks to form the respective isolated candidate reference sequence from each frequency-domain signal data block.

In Example 31, the subject matter of Example 30 can optionally include wherein each candidate reference sequence is located on central subcarriers of each of the plurality of carrier channels, and wherein selecting the samples from each of the frequency-domain signal data blocks to form the respective isolated candidate reference sequence from each frequency-domain signal data block includes selecting the samples from the central subcarriers of each frequency-domain signal data block.

In Example 32, the subject matter of Example 30 can optionally include wherein each candidate reference sequence is located on predefined subcarriers of each of the plurality of carrier channels, and wherein the samples selected from each frequency-domain signal data block correspond to subcarriers that contain samples of each candidate reference sequence.

In Example 33, the subject matter of any one of Examples 27 to 32 can optionally include wherein obtaining the signal data block for each of the plurality of carrier channels includes receiving a wideband radio signal across a collective bandwidth of the plurality of carrier channels and filtering the wideband radio signal to obtain the signal data block for each of the plurality of carrier channels.

In Example 34, the subject matter of any one of Examples 27 to 33 can optionally include wherein determining whether any of the plurality of carrier channels contain an active network based on the detection results includes if one of the candidate reference sequences of the plurality of carrier channels matches the composite detection sequence, determining that the corresponding carrier channel of the plurality of carrier channels contains an active network.

In Example 35, the subject matter of any one of Examples 27 to 34 can optionally include wherein comparing the aggregated signal data block to the composite detection sequence to detect whether any of the candidate reference sequences match any of the plurality of predefined reference sequences represented in the composite detection sequence includes calculating a cross-correlation between the aggregated signal data block and the composite detection sequence to obtain a cross-correlation sequence, and analyzing peaks of the cross-correlation sequence to determine whether any of the candidate reference sequences match the composite detection sequence.

In Example 36, the subject matter of Example 35 can optionally include wherein the aggregated signal data block and the composite detection sequence are frequency-domain sequences.

In Example 37, the subject matter of Example 35 or 36 can optionally include wherein analyzing peaks of the cross-correlation sequence to determine whether any of the candidate reference sequences match the composite detection sequence includes identifying any peaks of the cross-correlation sequence, determining whether any of the peaks of the cross-correlation sequence occur at predetermined sample locations corresponding to any of the candidate reference sequences, and if any of the peaks occur at predefined sample locations corresponding to any of the candidate reference sequences, determining that the corresponding candidate reference sequence matches the composite detection sequence.

In Example 38, the subject matter of Example 37 can optionally include wherein aggregating the isolated candidate reference sequences to obtain the aggregated signal data block includes concatenating the isolated candidate reference sequences to one another to obtain the aggregated signal data block, and the predetermined sample locations are concatenation points of the isolated candidate reference sequences in the aggregated signal data block.

In Example 39, the subject matter of Example 37 can optionally include wherein aggregating the isolated candidate reference sequences to obtain the aggregated signal data block includes summing cyclically-shifted versions of each of the isolated candidate reference sequences to obtain the aggregated signal data block, wherein the predetermined sample locations correspond to the cyclic shift values of each of the cyclically-shifted versions of the isolated candidate reference sequences within the aggregated signal data block.

In Example 40, the subject matter of any one of Examples 27 to 39 can optionally include wherein aggregating the isolated candidate reference sequences to obtain the aggregated signal data block includes concatenating the isolated candidate reference sequences to one another to obtain the aggregated signal data block.

In Example 41, the subject matter of Example 38 can optionally include wherein the aggregated signal data block is longer than each of the isolated candidate reference sequences.

In Example 42, the subject matter of any one of Examples 27 to 39 can optionally include wherein aggregating the isolated candidate reference sequences to obtain the aggregated signal data block includes summing cyclically-shifted versions of each of the isolated candidate reference sequences to obtain the aggregated signal data block.

In Example 43, the subject matter of Example 38 can optionally include wherein the aggregated signal data block is the same length as each of the isolated candidate reference sequences.

In Example 44, the subject matter of any one of Examples 27 to 43 can optionally include wherein determining whether any of the plurality of carrier channels contain an active network based on the detection results includes determining from the detection results which of the candidate reference sequences match the composite detection sequence, and determining that the carrier channels of the plurality of carrier channels corresponding to the matching candidate reference sequences contain active networks.

In Example 45, the subject matter of any one of Examples 27 to 44 can optionally include wherein the candidate reference sequences are candidate Primary Synchronization Sequences (PSSs).

In Example 46, the subject matter of any one of Examples 27 to 45 can optionally include wherein determining whether any of the plurality of carrier channels contain an active network based on the detection results includes determining whether any of the plurality of carrier channels contain an active Long Term Evolution (LTE) network based on the detection results.

In Example 47, the subject matter of any one of Examples 27 to 46 can optionally include wherein the plurality of carrier channels are synchronized in time.

In Example 48, the subject matter of any one of Examples 27 to 47 can optionally include wherein the wideband signal data has a duration of the symbol period of the plurality of predefined reference sequences.

In Example 49, the subject matter of any one of Examples 27 to 48 can optionally include wherein the plurality of carrier channels are predefined shared spectrum channels.

In Example 50, the subject matter of Example 49 can optionally include wherein the plurality of carrier channels are Priority Access License (PAL) channels in a Spectrum Access System (SAS) network.

In Example 51, the subject matter of any one of Examples 27 to 50 can optionally further include if a first carrier channel of the plurality of carrier channels is determined to not contain an active network, accessing the first carrier channel.

Example 52 is a processing circuit arrangement configured to perform the method of any one of Examples 27 to 51.

Example 53 is a baseband modem configured to perform the method of any one of Examples 27 to 51.

Example 54 is a radio communication device configured to perform the method of any one of Examples 27 to 51.

Example 55 is a communication circuit arrangement including a subsampling circuit configured to obtain wideband signal data including candidate reference sequences from a plurality of carrier channels and to downsample the wideband signal data to shift the candidate reference sequences closer to each other in frequency, a comparison circuit configured to compare the downsampled signal data to a composite detection sequence to detect whether any of the candidate reference sequences match any of a plurality of predefined reference sequences in the composite detection sequence, and a decision circuit configured to determine whether any of the plurality of carrier channels contain an active network based on the detection results.

In Example 56, the subject matter of Example 55 can optionally further include a radio frequency (RF) transceiver and an antenna array and configured as a radio communication device.

In Example 57, the subject matter of Example 55 can optionally include wherein the RF transceiver is configured to access the first carrier channel if a first carrier channel of the plurality of carrier channels is determined to not contain an active network.

In Example 58, the subject matter of Example 55 or 56 can optionally include wherein the composite detection sequence is correlated with each of the predefined reference sequences.

In Example 59, the subject matter of any one of Examples 55 to 58 can optionally include wherein the composite detection sequence is a sum of the plurality of predefined reference sequences.

In Example 60, the subject matter of any one of Examples 55 to 59 can optionally include wherein the candidate reference sequences are separated by a first frequency distance in the wideband signal data and by a second frequency distance less than the first frequency distance in the downsampled signal data.

In Example 61, the subject matter of any one of Examples 55 or 57 to 60 can optionally further include a radio frequency (RF) transceiver configured to receive the wideband radio signal across a collective bandwidth of the plurality of carrier channels and convert the wideband radio signal to digital baseband to obtain the wideband signal data.

In Example 62, the subject matter of any one of Examples 55 to 61 can optionally include wherein the decision circuit is configured to determine whether any of the plurality of carrier channels contain an active network based on the detection results by if one of the candidate reference sequences of the plurality of carrier channels matches the composite detection sequence, determining that the corresponding carrier channel of the plurality of carrier channels contains an active network.

In Example 63, the subject matter of any one of Examples 55 to 62 can optionally include wherein the subsampling circuit is further configured to downsample the wideband signal data to shift the candidate reference sequences closer to each other in frequency by sampling the wideband signal data at a sampling rate less than the Nyquist rate of the wideband signal data.

In Example 64, the subject matter of any one of Examples 55 to 63 can optionally further include a frequency transform circuit configured to perform a frequency transform on the downsampled signal data to obtain frequency-domain signal data, and wherein the comparison circuit is configured to compare the downsampled signal data to the composite detection sequence to detect whether any of the candidate reference sequences match any of the plurality of predefined reference sequences represented in the composite detection sequence by comparing the frequency-domain signal data to the composite detection sequence.

In Example 65, the subject matter of Example 64 can optionally include wherein the comparison circuit is configured to compare the frequency-domain signal data to the composite detection sequence by performing a cross-correlation between the frequency-domain signal data and the composite detection sequence to obtain a cross-correlation sequence.

In Example 66, the subject matter of Example 65 can optionally include wherein the comparison circuit is configured to compare the downsampled signal data to the composite detection sequence to detect whether any of the candidate reference sequences match any of the plurality of predefined reference sequences represented in the composite detection sequence includes comparing the frequency-domain signal data to the composite detection by evaluating the cross-correlation sequence to determine whether any peak values of the cross-correlation sequence occur at predefined sample locations in the cross-correlation sequence, and if peak values are identified at any of the predefined sample locations, determining that one or more of the candidate reference sequences matches the composite detection sequence.

In Example 67, the subject matter of Example 66 can optionally include wherein the candidate reference sequences are located at predefined frequency locations in the frequency-domain signal data and wherein each of the predefined sample locations correspond to a respective predefined frequency location of one of the candidate reference sequences in the frequency-domain signal data.

In Example 68, the subject matter of Example 66 can optionally include wherein the decision circuit is configured to determine that one or more of the candidate reference sequences matches the composite detection sequence if peak values are identified at any of the predefined sample locations by identifying a first peak value of the cross-correlation sequence, determining that the first peak value occurs at a predefined sample location of the cross-correlation sequence corresponding to a predefined frequency location of a first candidate reference sequence of the candidate reference sequences in the frequency-domain signal data, and determining that the first candidate reference sequence matches the composite sequence.

In Example 69, the subject matter of any one of Examples 55 to 68 can optionally include wherein the decision circuit is configured to determine whether any of the plurality of carrier channels contain an active network based on the detection results by determining from the detection results which of the candidate reference sequences match the composite detection sequence, and determining that the carrier channels of the plurality of carrier channels corresponding to the matching candidate reference sequences contain active networks.

In Example 70, the subject matter of any one of Examples 55 to 61 can optionally include wherein the composite detection sequence is a frequency-domain sequence, and wherein the comparison circuit is configured to compare the downsampled signal data to the composite detection sequence to detect whether any of the candidate reference sequences match any of the plurality of predefined reference sequences represented in the composite detection sequence by cross-correlating the composite detection sequence with a frequency-domain representation of the downsampled signal data to obtain a cross-correlation sequence and identifying whether any peaks in the cross-correlation sequence occur at sample locations associated with any of the candidate reference sequences.

In Example 71, the subject matter of Example 70 can optionally include wherein the decision circuit is configured to detect whether any of the plurality of carrier channels contain an active network based on the detection results by if any peaks in the cross-correlation sequence occur at sample locations associated with any of the candidate reference sequences, determining that the carrier channels corresponding to the associated candidate reference sequences contain active networks.

In Example 72, the subject matter of Example 70 can optionally include wherein the composite detection sequence is a sum of cyclically-shifted versions of plurality of predefined reference sequences, and wherein the comparison circuit is configured to compare the downsampled signal data to the composite detection sequence to detect whether any of the candidate reference sequences match any of the plurality of predefined reference sequences represented in the composite detection sequence by cross-correlating the composite detection sequence with a frequency-domain representation of the downsampled signal data to obtain a cross-correlation sequence and identifying whether any peaks in the cross-correlation sequence occur at sample locations associated with any of the candidate reference sequences and the cyclic shifts of each cyclically-shifted version of the plurality of predefined reference sequences of the composite detection sequence.

In Example 73, the subject matter of any one of Examples 55 to 72 can optionally include wherein the candidate reference sequences are candidate Primary Synchronization Sequences (PSSs).

In Example 74, the subject matter of any one of Examples 55 to 73 can optionally include wherein the decision circuit is configured to determine whether any of the plurality of carrier channels contain an active network based on the detection results by determining whether any of the plurality of carrier channels contain an active Long Term Evolution (LTE) network based on the detection results.

In Example 75, the subject matter of any one of Examples 55 to 74 can optionally include wherein the plurality of carrier channels are synchronized in time.

In Example 76, the subject matter of any one of Examples 55 to 75 can optionally include wherein the wideband signal data has a duration of the symbol period of the plurality of predefined reference sequences.

In Example 77, the subject matter of any one of Examples 55 to 76 can optionally include wherein the plurality of carrier channels are predefined shared spectrum channels.

In Example 78, the subject matter of Example 77 can optionally include wherein the plurality of carrier channels are Priority Access License (PAL) channels in a Spectrum Access System (SAS) network.

Example 79 is a communication circuit arrangement including aggregation circuitry configured to obtain a signal data block for each of a plurality of carrier channels, each signal data block including a respective candidate reference sequence, and to isolate the respective candidate reference sequences from the signal data blocks and aggregate the isolated candidate reference sequences to obtain an aggregated signal data block, a comparison circuit configured to compare the aggregated signal data block to a composite detection sequence to detect whether any of the candidate reference sequences match any of a plurality of predefined reference sequences represented in the composite detection sequence, and a decision circuit configured to determine whether any of the plurality of carrier channels contain an active network based on the detection results.

In Example 80, the subject matter of Example 79 can optionally further include a radio frequency (RF) transceiver and an antenna array and configured as a radio communication device.

In Example 81, the subject matter of Example 80 can optionally include wherein the RF transceiver is configured to access the first carrier channel if a first carrier channel of the plurality of carrier channels is determined to not contain an active network.

In Example 82, the subject matter of any one of Examples 79 to 81 can optionally include wherein the composite detection sequence is correlated with each of the plurality of predefined reference sequences.

In Example 83, the subject matter of any one of Examples 79 to 82 can optionally include wherein the composite detection sequence is a sum of the plurality of predefined reference sequences.

In Example 84, the subject matter of any one of Examples 79 to 83 can optionally include wherein the aggregation circuitry includes a frequency transform circuit configured to perform a frequency transform on each of the signal data blocks to obtain frequency-domain signal data blocks, the aggregation circuit configured to aggregate the candidate reference sequences from the signal data block by selecting samples from each of the frequency-domain signal data blocks to form the respective isolated candidate reference sequence from each frequency-domain signal data block.

In Example 85, the subject matter of Example 84 can optionally include wherein the frequency transform circuit includes a plurality of Fast Fourier Transform (FFT) circuits each configured to perform a frequency transform on a respective one of the signal data blocks.

In Example 86, the subject matter of Example 84 can optionally include wherein each candidate reference sequence is located on the central subcarriers of each of the plurality of carrier channels, and wherein the aggregation circuitry is configured to select the samples from each of the frequency-domain signal data blocks to form the respective isolated candidate reference sequence from each frequency-domain signal data block by selecting the samples from the central sub carriers of each frequency-domain signal data block.

In Example 87, the subject matter of Example 84 can optionally include wherein each candidate reference sequence is located on predefined subcarriers of each of the plurality of carrier channels, and wherein the samples selected from each frequency-domain signal data block correspond to subcarriers that contain samples of each candidate reference sequence.

In Example 88, the subject matter of any one of Example 79 or 82 to 87 can optionally further include a radio frequency (RF) transceiver configured to receive a wideband radio signal across a collective bandwidth of the plurality of carrier channels and filter the wideband radio signal to obtain the signal data block for each of the plurality of carrier channels.

In Example 89, the subject matter of any one of Examples 79 to 88 can optionally include wherein the decision circuit is configured to determine whether any of the plurality of carrier channels contain an active network based on the detection results by if one of the candidate reference sequences of the plurality of carrier channels matches the composite detection sequence, determining that the corresponding carrier channel of the plurality of carrier channels contains an active network.

In Example 90, the subject matter of any one of Examples 79 to 89 can optionally include wherein the comparison circuit is configured to compare the aggregated signal data block to the composite detection sequence to detect whether any of the candidate reference sequences match any of the plurality of predefined reference sequences represented in the composite detection sequence by calculating a cross-correlation between the aggregated signal data block and the composite detection sequence to obtain a cross-correlation sequence, and analyzing peaks of the cross-correlation sequence to determine whether any of the candidate reference sequences match the composite detection sequence.

In Example 91, the subject matter of Example 90 can optionally include wherein the aggregated signal data block and the composite detection sequence are frequency-domain sequences.

In Example 92, the subject matter of Example 90 or 91 can optionally include wherein the comparison circuit is configured to analyze peaks of the cross-correlation sequence to determine whether any of the candidate reference sequences match the composite detection sequence by identifying any peaks of the cross-correlation sequence, determining whether any of the peaks of the cross-correlation sequence occur at predetermined sample locations corresponding to any of the candidate reference sequences, and if any of the peaks occur at predefined sample locations corresponding to any of the candidate reference sequences, determining that the corresponding candidate reference sequence matches the composite detection sequence.

In Example 93, the subject matter of Example 92 can optionally include wherein the aggregation circuitry is configured to aggregate the isolated candidate reference sequences to obtain the aggregated signal data block by concatenating the isolated candidate reference sequences to one another to obtain the aggregated signal data block, and the predetermined sample locations are concatenation points of the isolated candidate reference sequences in the aggregated signal data block.

In Example 94, the subject matter of Example 92 can optionally include wherein the aggregation circuitry is configured to aggregate the isolated candidate reference sequences to obtain the aggregated signal data block by summing cyclically-shifted versions of each of the isolated candidate reference sequences to obtain the aggregated signal data block, wherein the predetermined sample locations correspond to the cyclic shift values of each of the cyclically-shifted versions of the isolated candidate reference sequences within the aggregated signal data block.

In Example 95, the subject matter of any one of Examples 79 to 94 can optionally include wherein the aggregation circuit is configured to aggregate the isolated candidate reference sequences to obtain the aggregated signal data block by concatenating the isolated candidate reference sequences to one another to obtain the aggregated signal data block.

In Example 96, the subject matter of Example 95 can optionally include wherein the aggregated signal data block is longer than each of the isolated candidate reference sequences.

In Example 97, the subject matter of any one of Examples 79 to 94 can optionally include wherein the aggregation circuitry is configured to aggregate the isolated candidate reference sequences to obtain the aggregated signal data block by summing cyclically-shifted versions of each of the isolated candidate reference sequences to obtain the aggregated signal data block.

In Example 98, the subject matter of Example 97 can optionally include wherein the aggregated signal data block is the same length as each of the isolated candidate reference sequences.

In Example 99, the subject matter of any one of Examples 79 to 98 can optionally include wherein the decision circuit is configured to determine whether any of the plurality of carrier channels contain an active network based on the detection results by determining from the detection results which of the candidate reference sequences match the composite detection sequence, and determining that the carrier channels of the plurality of carrier channels corresponding to the matching candidate reference sequences contain active networks.

In Example 100, the subject matter of any one of Examples 79 to 99 can optionally include wherein the candidate reference sequences are candidate Primary Synchronization Sequences (PSSs).

In Example 101, the subject matter of any one of Examples 79 to 100 can optionally include wherein the decision circuit is configured to determine whether any of the plurality of carrier channels contain an active network based on the detection results by determining whether any of the plurality of carrier channels contain an active Long Term Evolution (LTE) network based on the detection results.

In Example 102, the subject matter of any one of Examples 79 to 101 can optionally include wherein the plurality of carrier channels are synchronized in time.

In Example 103, the subject matter of any one of Examples 79 to 102 can optionally include wherein the wideband signal data has a duration of the symbol period of the plurality of predefined reference sequences.

In Example 104, the subject matter of any one of Examples 79 to 103 can optionally include wherein the plurality of carrier channels are predefined shared spectrum channels.

In Example 105, the subject matter of Example 104 can optionally include wherein the plurality of carrier channels are Priority Access License (PAL) channels in a Spectrum Access System (SAS) network.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication circuit arrangement comprising:
a subsampling circuit configured to obtain wideband signal data comprising candidate reference sequences from a plurality of carrier channels and to downsample the wideband signal data to shift the candidate reference sequences closer to each other in frequency;
a comparison circuit configured to compare the downsampled signal data to a composite detection sequence, wherein the composite detection sequence comprises a sum of a plurality of predefined reference sequences occupying a frequency bandwidth that is narrower than a frequency bandwidth of the plurality of carrier channels, to detect whether any of the candidate reference sequences match any of the plurality of predefined reference sequences in the composite detection sequence; and a decision circuit configured to determine whether any of the plurality of carrier channels contain an active network based on the detection results.

2. The communication circuit arrangement of claim 1, further comprising a radio frequency (RF) transceiver and an antenna array and configured as a radio communication device.

3. The communication circuit arrangement of claim 1, wherein the composite detection sequence is correlated with each of the predefined reference sequences.

4. The communication circuit arrangement of claim 1, wherein the decision circuit is configured to determine whether any of the plurality of carrier channels contain an active network based on the detection results by:

if one of the candidate reference sequences of the plurality of carrier channels matches the composite detection sequence, determining that the corresponding carrier channel of the plurality of carrier channels contains an active network.

5. The communication circuit arrangement of claim 1, further comprising a frequency transform circuit configured to perform a frequency transform on the downsampled signal data to obtain frequency-domain signal data, and wherein the comparison circuit is configured to compare the downsampled signal data to the composite detection sequence to detect whether any of the candidate reference sequences match any of the plurality of predefined reference sequences represented in the composite detection sequence by comparing the frequency-domain signal data to the composite detection sequence.

6. The communication circuit arrangement of claim 5, wherein the comparison circuit is configured to compare the frequency-domain signal data to the composite detection sequence by:

performing a cross-correlation between the frequency-domain signal data and the composite detection sequence to obtain a cross-correlation sequence.

7. The communication circuit arrangement of claim 6, wherein the comparison circuit is configured to compare the frequency-domain signal data to the composite detection by:

evaluating the cross-correlation sequence to determine whether any peak values of the cross-correlation sequence occur at predefined sample locations in the cross-correlation sequence; and if peak values are identified at any of the predefined sample locations, determining that one or more of the candidate reference sequences matches the composite detection sequence.

8. The communication circuit arrangement of claim 7, wherein the candidate reference sequences are located at predefined frequency locations in the frequency-domain signal data and wherein each of the predefined sample locations correspond to a respective predefined frequency location of one of the candidate reference sequences in the frequency-domain signal data.

9. The communication circuit arrangement of claim 1, wherein the decision circuit is configured to determine whether any of the plurality of carrier channels contain an active network based on the detection results by:

determining from the detection results which of the candidate reference sequences match the composite detection sequence; and determining that the carrier channels of the plurality of carrier channels corresponding to the matching candidate reference sequences contain active networks.

10. The communication circuit arrangement of claim 1, wherein the composite detection sequence is a frequency-domain sequence, and wherein the comparison circuit is configured to compare the downsampled signal data to the composite detection sequence to detect whether any of the candidate reference sequences match any of the plurality of predefined reference sequences represented in the composite detection sequence by:

cross-correlating the composite detection sequence with a frequency-domain representation of the downsampled signal data to obtain a cross-correlation sequence and identifying whether any peaks in the cross-correlation sequence occur at sample locations associated with any of the candidate reference sequences.

11. The communication circuit arrangement of claim 10, wherein the decision circuit is configured to detect whether any of the plurality of carrier channels contain an active network based on the detection results by:

if any peaks in the cross-correlation sequence occur at sample locations associated with any of the candidate reference sequences, determining that the carrier channels corresponding to the associated candidate reference sequences contain active networks.

12. A method of detecting radio activity on carrier channels, the method comprising:

obtaining wideband signal data comprising candidate reference sequences from a plurality of carrier channels;

downsampling the wideband signal data to shift the candidate reference sequences s closer to each other in frequency;

comparing the downsampled signal data to a composite detection sequence, wherein the composite detection sequence comprises a sum of a plurality of predefined reference sequences occupying a frequency bandwidth that is narrower than a frequency bandwidth of the wideband signal data, to detect whether any of the candidate reference sequences match any of the plurality of predefined reference sequences represented in the composite detection sequence; and determining whether any of the plurality of carrier channels contain an active network based on the detection results.

13. The method of claim 12, wherein the composite detection sequence is correlated with each of the predefined reference sequences.

14. The method of claim 12, further comprising determining whether any of the plurality of carrier channels contain an active network based on the detection results by, based on one of the candidate reference sequences of the plurality of carrier channels matching the composite detection sequence, determining that the corresponding carrier channel of the plurality of carrier channels contains an active network.

15. The method of claim 12, further comprising performing a frequency transform on the downsampled signal data to obtain frequency-domain signal data, and wherein the comparison circuit is configured to compare the downsampled signal data to the composite detection sequence to detect whether any of the candidate reference sequences match any of the plurality of predefined reference sequences represented in the composite detection sequence by comparing the frequency-domain signal data to the composite detection sequence.

16. One or more non-transitory readable media including instructions thereon that, when executed by one or more processors of a device, cause the device to:
- obtain wideband signal data comprising candidate reference sequences from a plurality of carrier channels and to downsample the wideband signal data to shift the candidate reference sequences closer to each other in frequency;
- compare the downsampled signal data to a composite detection sequence, wherein the composite detection sequence comprises a sum of a plurality of predefined reference sequences occupying a frequency bandwidth that is narrower than a frequency bandwidth of the wideband signal data, to detect whether any of the candidate reference sequences match any of the plurality of predefined reference sequences in the composite detection sequence; and
- determine whether any of the plurality of carrier channels contain an active network based on the detection results.

17. The one or more non-transitory readable media of claim 16, wherein the composite detection sequence is correlated with each of the predefined reference sequences.

18. The one or more non-transitory readable media of claim 16, the instructions further causing the device to determine whether any of the plurality of carrier channels contain an active network based on the detection results by, based on one of the candidate reference sequences of the plurality of carrier channels matching the composite detection sequence, determining that the corresponding carrier channel of the plurality of carrier channels contains an active network.

19. The one or more non-transitory readable media of claim 16, the instructions further causing the device to perform a frequency transform on the downsampled signal data to obtain frequency-domain signal data, and wherein the comparison circuit is configured to compare the downsampled signal data to the composite detection sequence to detect whether any of the candidate reference sequences match any of the plurality of predefined reference sequences represented in the composite detection sequence by comparing the frequency-domain signal data to the composite detection sequence.

20. A communication device comprising one or more processors configured to:
- obtain wideband signal data comprising candidate reference sequences from a plurality of carrier channels and to downsample the wideband signal data to shift the candidate reference sequences closer to each other in frequency;
- compare the downsampled signal data to a composite detection sequence, wherein the composite detection sequence comprises a sum of a plurality of predefined reference sequences occupying a frequency bandwidth that is narrower than a frequency bandwidth of the wideband signal data, to detect whether any of the candidate reference sequences match any of the plurality of predefined reference sequences in the composite detection sequence; and
- determine whether any of the plurality of carrier channels contain an active network based on the detection results.

21. The communication device of claim 20, wherein the composite detection sequence is correlated with each of the predefined reference sequences.

22. The communication device of claim 20, the one or more processors further configured to determine whether any of the plurality of carrier channels contain an active network based on the detection results by:
- based on one of the candidate reference sequences of the plurality of carrier channels matching the composite detection sequence, determining that the corresponding carrier channel of the plurality of carrier channels contains an active network.

23. The communication device of claim 20, the one or more processors further configured to perform a frequency transform on the downsampled signal data to obtain frequency-domain signal data,
- and wherein the one or more processors are configured to compare the downsampled signal data to the composite detection sequence to detect whether any of the candidate reference sequences match any of the plurality of predefined reference sequences represented in the composite detection sequence by comparing the frequency-domain signal data to the composite detection sequence.

24. The communication device of claim 23, the one or more processors further configured to compare the frequency-domain signal data to the composite detection sequence by:
- performing a cross-correlation between the frequency-domain signal data and the composite detection sequence to obtain a cross-correlation sequence.

25. The communication device of claim 24, the one or more processors further configured to compare the frequency-domain signal data to the composite detection by:
- evaluating the cross-correlation sequence to determine whether any peak values of the cross-correlation sequence occur at predefined sample locations in the cross-correlation sequence; and
- based on peak values identified at any of the predefined sample locations, determining that one or more of the candidate reference sequences matches the composite detection sequence.

* * * * *